(12) United States Patent
Fuchs et al.

(10) Patent No.: US 8,655,110 B2
(45) Date of Patent: Feb. 18, 2014

(54) IMAGE PROCESSING DEVICE, METHOD AND PROGRAM

(75) Inventors: Steven Fuchs, Stony Brook, NY (US); Hiroki Uwai, Yokohama (JP); Keita Kimura, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/448,764

(22) Filed: Apr. 17, 2012

(65) Prior Publication Data

US 2012/0230609 A1    Sep. 13, 2012

Related U.S. Application Data

(63) Continuation of application No. 13/067,729, filed on Jun. 22, 2011, now abandoned, which is a continuation of application No. 12/219,754, filed on Jul. 28, 2008, now abandoned, which is a continuation of application No. 10/948,279, filed on Sep. 24, 2004, now abandoned.

(51) Int. Cl.
*G06K 9/60* (2006.01)
*G09G 5/00* (2006.01)
*G06F 3/00* (2006.01)
*G06F 3/048* (2013.01)

(52) U.S. Cl.
USPC ............ 382/305; 345/619; 715/762; 715/763

(58) Field of Classification Search
USPC .................... 382/305; 345/619; 715/762, 763
See application file for complete search history.

(56) References Cited

U.S. PATENT DOCUMENTS

| | | | | |
|---|---|---|---|---|
| 5,121,448 | A * | 6/1992 | Katayama et al. | 382/284 |
| 6,333,752 | B1 | 12/2001 | Hasegawa et al. | |
| 6,590,584 | B1 | 7/2003 | Yamaura et al. | |
| 6,647,125 | B2 * | 11/2003 | Matsumoto et al. | 382/100 |
| 6,834,130 | B1 * | 12/2004 | Niikawa et al. | 382/305 |
| 6,850,248 | B1 | 2/2005 | Crosby et al. | |
| 6,870,547 | B1 * | 3/2005 | Crosby et al. | 345/619 |
| 6,904,185 | B1 | 6/2005 | Wilkins et al. | |
| 6,912,692 | B1 * | 6/2005 | Pappas | 715/762 |
| 7,065,249 | B2 * | 6/2006 | Fushiki et al. | 382/167 |
| 7,092,969 | B2 | 8/2006 | Meek et al. | |

(Continued)

OTHER PUBLICATIONS

Adobe® Photoshop® 7.0 printout, 2 pages, Photoshop 7.0 released Mar. 2002.

(Continued)

*Primary Examiner* — Vu Le
*Assistant Examiner* — Soo Park
(74) *Attorney, Agent, or Firm* — Oliff PLC

(57) ABSTRACT

A marker corresponding to an editing state at an arbitrary point in time of image data being edited is stored in memory. The image of an arbitrary editing state can be displayed by a user selecting the displayed marker. The original image data is not updated. When saving the image data file, the saved editing state at an arbitrary point of time can be saved as a single file together with the original image data. By selecting a plurality of markers, images corresponding to a plurality of processing states can be displayed simultaneously. A marker can be used to create a new image data file of a desired processing state, or a plurality of markers can be selected to create a plurality of new image data files. Image data can be displayed as thumbnail images, and thumbnail images and ordinary images can be concurrently displayed.

15 Claims, 22 Drawing Sheets

(56) References Cited

U.S. PATENT DOCUMENTS

| | | | |
|---|---|---|---|
| 7,142,225 B1* | 11/2006 | Boler et al. | 345/619 |
| 7,382,380 B1* | 6/2008 | Crosby et al. | 345/619 |
| 7,548,247 B2* | 6/2009 | Kotani | 345/619 |
| 2001/0049704 A1 | 12/2001 | Hamburg et al. | |
| 2005/0075944 A1 | 4/2005 | Murata et al. | |
| 2005/0091270 A1 | 4/2005 | Beilinson et al. | |

OTHER PUBLICATIONS

Oct. 17, 2011 Office Action issued in U.S. Appl. No. 13/067,729.
May 27, 2010 Office Action issued in U.S. Appl. No. 12/219,754.
Dec. 22, 2010 Office Action issued in U.S. Appl. No. 12/219,754.
Jan. 28, 2008 Office Action issued in U.S. Appl. No. 10/948,279.

* cited by examiner

IMAGE PROCESSING DEVICE, METHOD AND PROGRAM

This is a Continuation of application Ser. No. 13/067,729 filed Jun. 22, 2011, which in turn is a Continuation of application Ser. No. 12/219,754 filed Jul. 28, 2008, which in turn is a Continuation of application Ser. No. 10/948,279 filed Sep. 24, 2004. The disclosures of the prior applications are hereby incorporated by reference herein in their entirety.

BACKGROUND OF THE INVENTION

1. Field of Invention

The present invention generally relates to image processing devices, methods and programs, and in particular relates to image processing devices, methods and programs capable of recording in memory the editing state of an arbitrary point in time.

2. Description of Related Art

In conventional image editing processing, a user is able to store the editing state of an image by commanding the storage of such image in one's desired state. Further, certain image editing application programs such as PhotoShop are provided with a History function, whereby the editing state is automatically saved without the user having to consciously command storage processing. Thus, the user is able to return the editing state of an image back to a desired point in time.

In the processing for saving the editing state, a new saved file is created for each state, and is saved separately from the image data being processed. In addition, when the user commands the return to the saved state, the image data being processed, that is, the latest image data, is overwritten based on the data of the saved file.

Moreover, when using the History function, all processing contents will be recorded as History in chronological order, and in order to return to a desired state, the recorded History data is utilized such that the latest image data is overwritten based on the History data from the desired state.

Nevertheless, the storage processing employed in conventional image editing requires the creation of a saved file for each such storage processing, and much time is required to do this. In addition, in order to record a plurality of states for a single image data, a plurality of files needs to be created and saved.

Further, conventionally, upon saving the editing state, when once returning from the latest state to a desired editing state of the past by tracing back the processing and then commencing new processing from such a state, the processing contents implemented up to the latest state prior to tracing back the processing will not be saved as a saved file (i.e., it is overwritten). Similarly, with the History function, when once returning from the latest state to a desired editing state of the past by tracing back the processing and then commencing new processing from such a state, the processing contents implemented up to the latest state prior to tracing back the processing will be deleted from the History data. Therefore, in order for the user to add new processing from the desired processing state by tracing back the processing while keeping the current and latest processing state, and to compare the two states, the user was forced to perform complicated processing.

In addition, for example, when the image being processed is saved or the application is ended, the archive data of the saved file and History function will be deleted, and when the once saved image file is to be reopened, it is not possible to use the archive of the previous processing.

SUMMARY OF THE INVENTION

The present invention was devised in view of the foregoing circumstances, and has as one object the facilitation of recording in a memory the editing state of image data of an arbitrary point in time, and when saving the image data, the recorded editing state of the arbitrary point in time can be saved together with the original image data.

An image processing device of one aspect of the present invention includes: an original image data storage means for saving original image data; an operational input acquisition means for acquiring operational inputs of a user; a command and parameter storage means for temporarily saving a command and a parameter for editing the original image data acquired through the operational input acquisition means; an editing means for editing the original image data and creating edited image data based on the command and the parameter acquired with the operational input acquisition means; a marker storage means for saving one or a plurality of the commands and the parameters temporarily saved in the command and parameter storage means as marker data for showing the editing state at a prescribed timing when an operational input commanding the storage of the current editing state is acquired through the operational input acquisition means; and a file storage control means for creating and saving a single image data file containing the original image data saved with the original image data storage means and the marker data saved with the marker storage means.

The image processing device also may include a thumbnail image data creation means for creating thumbnail image data based on the original image data, or based on the edited image data edited and created with the editing means.

The image processing device also may include an image data display control means for controlling the display of the original image data, or the display of the edited image data edited and created with the editing means.

The image processing device also may include a thumbnail image data creation means for creating thumbnail image data based on the original image data, or based on the edited image data edited and created with the editing means, and the image data display control means may additionally control the display of the thumbnail image data created with the thumbnail image data creation means.

The image processing device also may include a reading control means for controlling the reading of the image data file stored by the file storage control means, wherein when a plurality of the marker data is contained in the image data file, the editing means may edit the original image data and create a plurality of the edited image data based on the plurality of marker data contained in the image data file, and the image data display control means may control the display of the edited image data created with the editing means.

The image processing device also may include a marker data display control means for controlling the display of a list of the marker data saved with the marker storage means, wherein when an operational input is acquired with the operational input acquisition means for selecting any one of the marker data in the list displayed by the marker data display control means, the editing means may edit the original image data and create edited image data based on the marker data that was selected, and the image data display control means may control the display of the edited image data edited with the editing means.

When the operational input acquired with the operational input acquisition means is an operational input for selecting a plurality of the marker data among the marker data in the list displayed by the marker data display control means, the editing means may edit the original image data and create a plurality of the edited image data based on the plurality of marker data thus selected.

The image processing device also may include a thumbnail image data creation means for creating thumbnail image data based on the original image data, or based on the edited image data edited and created with the editing means, and the thumbnail image data creation means may create a plurality of the thumbnail image data based on a plurality of the edited image data edited and created based on a plurality of the marker data selected with the editing means.

When an operational input for commanding the storage of the image data file is acquired with the operational input acquisition means, the file storage control means may control the storage of a single image data file containing the original image data saved with the original image data storage means and the marker data saved with the marker storage means. The file storage control means may control the storage of a single image data file containing the command and the parameter saved with the command and parameter storage means in addition to the original image data saved with the original image data storage means and the marker data saved with the marker storage means.

The image processing device also may include a marker data display control means for controlling the display of a list of the marker data saved with the marker storage means, and a new original image data creation means for editing the original image data and creating new original image data based on the marker data saved with the marker storage means. When the operational input acquired with the operational input acquisition means is an operational input for selecting a plurality of the marker data among the marker data in the list displayed by the marker data display control means, the new original image data creation means may edit the original image data and create a plurality of the new original image data based on the plurality of marker data thus selected.

A program according to one aspect of the present invention includes instructions for performing: an original image data storage control step of controlling the storage of original image data; an operational input acquisition step of acquiring operational inputs of a user; a command and parameter storage control step of controlling the temporary storage of a command and a parameter for editing the original image data acquired through the processing of the operational input acquisition step; an editing step of editing the original image data and creating edited image data based on the command and the parameter acquired with the processing of the operational input acquisition step; a marker storage control step of controlling the storage of one or a plurality of the commands and the parameters in which the temporary storage thereof is controlled with the processing of the command and parameter storage control step as marker data for showing the editing state at a prescribed timing when an operational input commanding the storage of the current editing state is acquired through the operational input acquisition step; and a file storage control step of creating a single image data file containing the original image data in which storage thereof is controlled with the processing of the original image data storage control step and the marker data in which storage thereof is controlled with the processing of the marker storage control step, and controlling the storage of the image data file.

The program also may include instructions for performing a thumbnail image data creation step of creating thumbnail image data based on the original image data, or based on the edited image data edited and created with the processing of the editing step.

The program also may include instructions for performing an image data display control step of controlling the display of the original image data, or the display of the edited image data edited and created with the processing of the editing step.

The program also may include instructions for performing a thumbnail image data creation step of creating thumbnail image data based on the original image data, or based on the edited image data edited and created with the processing of the editing step, and the processing of the image data display control step may additionally control the display of the thumbnail image data created with the processing of the thumbnail image data creation step.

The program also may include instructions for performing a reading control step of controlling the reading of the image data file stored by the file storage control step, wherein when a plurality of the marker data is contained in the image data file, the processing of the editing step may edit the original image data and create a plurality of the edited image data based on the plurality of marker data contained in the image data file, and the processing of the image data display control step may control the display of the edited image data created with the processing of the editing step.

The program also may include instructions for performing a marker data display control step of controlling the display of a list of the marker data in which storage thereof is controlled with the processing of the marker storage control step, wherein when an operational input is acquired with the processing of the operational input acquisition step for selecting any one of the marker data in the list displayed by the processing of the marker data display control step, the processing of the editing step may edit the original image data and create edited image data based on the marker data that was selected, and the processing of the image data display control step may control the display of the edited image data edited with the processing of the editing step.

When the operational input acquired with the processing of the operational input acquisition step is an operational input for selecting a plurality of the marker data among the marker data in the list displayed by the processing of the marker display control step, the processing of the editing step may edit the original image data and create a plurality of the edited image data based on the plurality of marker data thus selected.

The program also may include instructions for performing a thumbnail image data creation step of creating thumbnail image data based on the original image data, or based on the edited image data edited and created with the processing of the editing step, and the processing of the thumbnail image data creation step may create a plurality of the thumbnail image data based on a plurality of the edited image data edited and created based on a plurality of the marker data selected with the processing of the editing step.

When an operational input for commanding the storage of the image data file is acquired with the processing of the operational input acquisition step, the processing of the file storage control step may control the storage of a single image data file containing the original image data in which storage thereof is controlled with the processing of the original image data storage control step and the marker data in which storage thereof is controlled with the processing of the marker storage control step. The processing of the file storage control step may control the storage of a single image data file containing the command and the parameter in which storage thereof is controlled with the processing of the command and parameter storage control step in addition to the original image data in which storage thereof is controlled with the processing of the original image data storage control step, and the marker data in which storage thereof is controlled with the processing of the marker storage control step.

The program also may include instructions for performing a marker data display control step of controlling the display of a list of the marker data in which storage thereof is controlled with the processing of the marker storage control step, and a new original image data creation step of editing the original image data and creating new original image data based on the marker data in which storage thereof is controlled with the processing of the marker storage control step. When the operational input acquired with the processing of the operational input acquisition step is an operational input for selecting a plurality of the marker data among the marker data in the list displayed by the processing of the marker display control step, the processing of the new original image data creation step may edit the original image data and create a plurality of the new original image data based on the plurality of marker data thus selected.

With the image processing device, method and program of some aspects of the present invention, original image data is saved, operational inputs of the user are acquired, commands and parameters for editing the original image data are temporarily saved, original image data is edited based on the commands and parameters so as to create edited image data, and when operational input commanding the storage of the current editing state is acquired, the temporarily saved one or a plurality of commands and parameters are saved as marker data representing the editing state of a prescribed timing, and a single image data file containing the original image data and marker data is saved.

BRIEF DESCRIPTION OF THE DRAWINGS

The invention will be described in conjunction with the following drawings in which like reference numerals designate like elements, and in which.

DETAILED DESCRIPTION OF PREFERRED EMBODIMENTS

Figure 1:
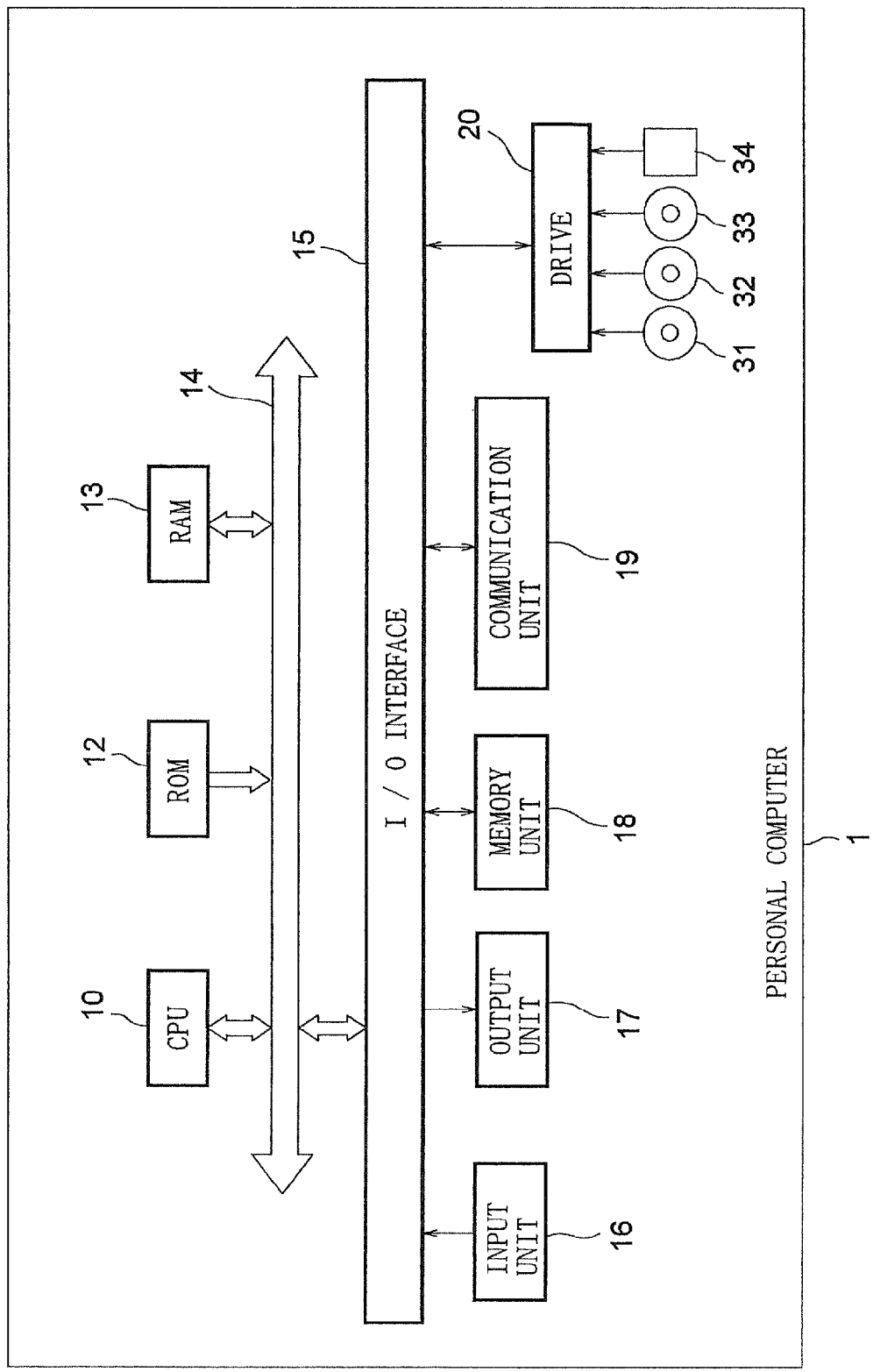
FIG. 1 is a block diagram showing the basic components of a personal computer.

An image processing device, for example, a personal computer, that performs image processing while implementing one aspect of the invention, is able to recognize the command for editing image data, which is input by a user with any of various input devices, and the parameter corresponding to such command as a single process, and apply the foregoing processes to the image data and display the current editing state. In addition, by temporarily saving the processes made by operational inputs, such a device implementing the present invention is able to save as markers the processes that are stored when the user wishes to save the editing state or when the user commands the closing of the image data file.

The user is able to command the storage of markers at a desired timing, and a plurality of markers may be saved. In addition, by applying the saved markers to the original data, the user is able to recreate one's desired editing state. In this instance, the original data will not be subject to overwriting processing employing the marker. Thus, without regard to the chronological order in which the markers were stored, the editing state corresponding to the markers may be recreated arbitrarily.

When the edited image is to be recorded, according to one embodiment of the invention, the image data file corresponding to the image data to be recorded will be composed of the original data, the marker saved by the user's processing, and the current process data, which is the process data saved when the storage of the image data file was commanded. In other words, when the user commands the storage of the image data file, the original data is not updated and saved, but rather the original data, saved marker and saved current process data are saved as a single image data file. Thus, when the user reopens the once saved image data, the marker and current process data saved with the user's processing also will be saved concurrently, and the user can therefore conduct editing while utilizing the editing state before storage.

In addition, not only can the present invention enable the recreation and confirmation of image data in a desired editing state employing the marker selected by the user, it also is able to create a new image data file based on the image data of such editing state. When a new image data file is created, the image data employing the marker designated by the user will be recognized as the original data of the new image data file.

The present invention can be used with various images such as photographs, a single frame of animation, illustrations, diagrams etc. Image data formats that can be used include, for example, BMP (BitMap), JPEG (Joint Photographic Experts Group), TIFF (Tagged Image File Format), gif (graphics interchange format), PIC, PICT, EPS (Encapsulated PostScript), DCS (Desktop Color Separations), PNG (Portable Network Graphics), PDF (Adobe Acrobat Portable Document Format), PCX and Scitex CT (Continuous Tone).

Next, exemplary embodiments that practice aspects of the present invention are explained with reference to the drawings.

FIG. 1 is a block diagram showing the constitution of a personal computer 1. The personal computer 1 may be, for example, a desktop computer or a laptop computer.

In FIG. 1, a CPU (Central Processing Unit) 10 executes various processing in accordance with programs stored in a ROM (Read Only Memory) 12, or programs loaded from a memory unlit 18 to a RAM (Random Access Memory) 13. Data and the like necessary for the CPU 10 to execute the various processing are appropriately stored in the RAM 13.

The CPU 10, ROM 12 and RAM 13 are mutually connected via a bi-directional bus 14. An I/O interface 15 also is connected to bus 14.

Connected to the I/O interface 15 are, for example, an input unit 16 which can be one or more of a keyboard, mouse, touch pad, joystick and track pad; an output unit 17 which can be one or more of a display and speaker; a memory unit 18 which can be, for example, a hard disk; and a communication unit 19 which can be, for example, one or more of a modem and a terminal adapter.

The input unit 16, upon receiving the operational input of the user, supplies to the CPU 10 a signal representing such user's operational input via the I/O interface 15 and bus 14. The output unit 17, based on the control of the CPU 10, displays data containing images or text on the screen for presenting such data to the user, and outputs sound from the speaker. The memory unit 18 stores application programs executable by the CPU 10, data created by such application programs, or available data. The communication unit 19 performs communication processing via a network, which can include, for example, the Internet.

A drive 20 also is connected to the I/O interface 15, and one or more of a magnetic disc 31, an optical disc 32, an optical magnetic disc 33, a semiconductor memory 34 or the like is installed thereon as necessary, and the computer program read out therefrom is installed in the memory unit 18 as necessary.

In the personal computer 1 explained with reference to FIG. 1, an image processing application program employing the present invention is installed in the memory unit 18 or ROM 12. Based on the operational input of the user input with the input unit 16, the CPU 10, by executing the image processing application program by loading it into the RAM 13, is able to perform image editing processing with the image data file saved in the memory unit 18, or save the newly created image data file or the image data file in which the marker containing the image data file in the memory unit 18 was updated.

Functions that are executed with the CPU 10 when an image processing application program employing the present invention is loaded into the RAM 13 and executed with the CPU 10 are now explained with reference to the functional block diagram of FIG. 2.

An operational input acquisition unit 51 acquires the operational input of the user input from the input unit 16 explained with reference to FIG. 1. A reading control unit 52 reads the image data file selected by the user from the memory unit 18 based on the user's operational input supplied from the operational input acquisition unit 51, supplies the original data to an original data storage unit 53, and, when a marker is contained in the image data file, supplies the marker to the marker storage unit 54 and saves it therein.

A command and parameter extraction unit 55 extracts the command and parameter for image processing from the operational input of the user supplied from the operational input acquisition unit 51. Some examples of possible commands include, for example, tone curve adjustment, color balance adjustment, brightness/contrast adjustment, hue/color saturation adjustment and the like. The respective commands are associated with a parameter, which can be, for example, the adjustment value, for example, a parameter representing the brightness, a parameter representing the color saturation, and so on.

A process storage unit 56 sequentially saves the command(s) and parameter(s) supplied from the command and parameter extraction unit 55 as the user's operational process. Further, when a command is made by the user to save the process saved in the process storage unit 56 as a marker based on the user's operational input supplied from the operational input acquisition unit 51, the process storage unit 56 supplies the saved process to the marker storage unit 54.

When a command is made to save the process saved in the process storage unit 56 as a marker, the marker storage unit 54 saves the process supplied from the process storage unit 56. That is, at least a pair of data (at least one command and its associated parameter) is saved as a single marker. Further, upon receiving a notification from the operational input acquisition unit 51 indicating that a marker has been selected by the user and an operational input representing that a command for displaying the image data corresponding to such marker has been made, the marker storage unit 54 supplies to an image processing unit 57 the data of the marker selected by the user. Moreover, upon receiving a notification from the operational input acquisition unit 51 indicating that a marker has been selected by the user and an operational input representing that a command for creating a new image data corresponding to such marker has been made, the marker storage unit 54 supplies to a marker applied image data creation unit 58 the data of the marker selected by the user.

The image processing unit 57 can perform processing corresponding to the command and parameter supplied from the command and parameter extraction unit 55 to the original data saved in the original data storage unit 53, and creates edited image data; in other words, image data corresponding to the latest image being displayed is created in this instance. The image processing unit 57 also can perform processing corresponding to the process contained in the marker selected by the user supplied from the marker storage unit 54 to the original data saved in the original data storage unit 53, and creates edited image data; in other words, image data corresponding to the image as it existed at the time corresponding to the selected marker is created and displayed on the output unit 17.

In addition, when the original data saved in the original data storage unit 53 is to be displayed, the image processing unit 57 acquires the original data saved in the original data storage unit 53 and supplies this to an image display control unit 60. In addition, when the original data is to be displayed as thumbnail images, the image processing unit 57 acquires the original data saved in the original data storage unit 53 and supplies this to a thumbnail image creation unit 59.

The thumbnail image creation unit 59 creates thumbnail image data based on the image data acquired from or created by the image processing unit 57 in accordance with a signal representing the operational input of the user supplied from the operational input acquisition unit 51 when, for instance, thumbnail images are to be displayed, or when the image data file is to be saved.

The image display control unit 60 controls the display of the image display area among the display windows indicated on the screen of the output unit 17 based on the image data or thumbnail image data created with the image processing unit 57 or the thumbnail image creation unit 59.

A marker data display control unit 61 controls the display of the marker data display area among the display windows indicated on the screen of the output unit 17 based on the marker(s) saved in the marker storage unit 54. A window display control unit 62 controls the display of the display window indicated on the screen of the output unit 17 based on the data supplied from the image display control unit 60 and the marker data display control unit 61.

Upon receiving a notification from the operational input acquisition unit 51 indicating that a marker has been selected by the user, and a command for creating a new image data file corresponding to such marker, the marker applied image data creation unit 58 receives the data of the marker selected by the user from the marker storage unit 54, performs processing corresponding to the command and parameter of the process contained in the selected marker to the original data saved in the original data storage unit 53, creates new image data, supplies this to the original data storage unit 53 as new original data, and saves it therein.

When a command for closing or saving the image data file has been made by the user via the operational input acquisition unit 51, a memory control unit 63 controls a file creation unit 64 so as to create the image data file to be saved, and, upon receiving the image data file to be saved from the file creation unit 64, supplies this to the memory unit 18 and saves it therein.

The file creation unit 64 reads from the original data storage unit 53 the original data corresponding to the image data to be closed or saved pursuant to the user's command based on the control of the memory control unit 63, reads from the marker storage unit 54 the marker corresponding to such image data, reads from the process storage unit 56 the current process corresponding to the image data, and further acquires the thumbnail image data corresponding to the latest edited image data created with the thumbnail image creation unit 59, creates a single image data file, and supplies this to the memory control unit 63.

Various settings may be made in the image processing application program.

In the image processing application program, for example, when a marker is contained in the image data file commanded to be opened, it is possible to set in advance whether the image to be displayed when opening the file is only an image corresponding to the original data, only an image corresponding to the image data subjected to processing corresponding to the current process upon being saved, or all images corresponding to the image data employing the markers contained in the image data file. Moreover, in the image processing application program, when a plurality of images are to be displayed when opening the file, it is possible to set in advance whether a plurality of thumbnail images are to be displayed on a single window, the ordinary image and thumbnail images are to be concurrently displayed on a single window, or the respective images are to be individually displayed on a plurality of windows.

In addition, when a command is made for saving or closing the file, although it has been explained above that an image data file containing the original data, marker, current process, and thumbnail images corresponding to the latest editing state is created and saved, it also is possible to set whether the thumbnail image data is to be contained in the image data file to be saved.

Figure 2:
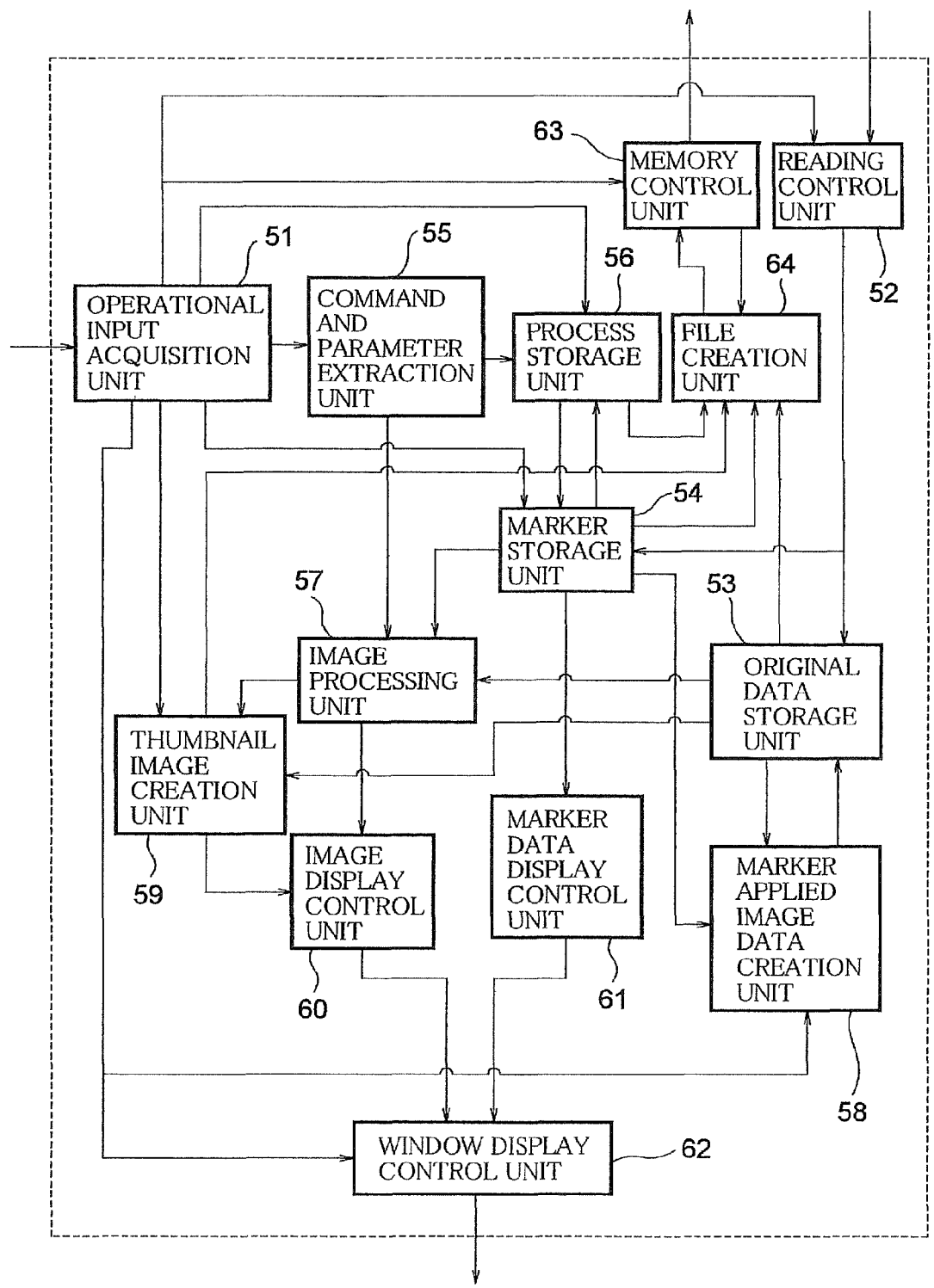
FIG. 2 is a functional block diagram showing some realizable functions when an image processing application program employing the present invention is executed.

Next, processing in a case where the image processing application program explained with reference to the functional block diagram of FIG. 2 is activated based on the operational input by the user is explained.

When the operational input acquisition unit 51 acquires an operational input commanding the reading of the image data file, the reading control unit 52 reads from the memory unit 18 the image data file commanded by the user to be read, supplies the original data contained in the image data file to the original data storage unit 53, and when a marker is contained in the image data file, supplies the data of the marker to the marker storage unit 54.

For example, if the setting is such that the image corresponding to the original data is to be displayed when the image data file is opened, the image processing unit 57 acquires the original data saved in the original data storage unit 53 and supplies this to the image display control unit 60. The marker storage unit 54 supplies the supplied marker information to the marker data display control unit 61.

Figure 3:
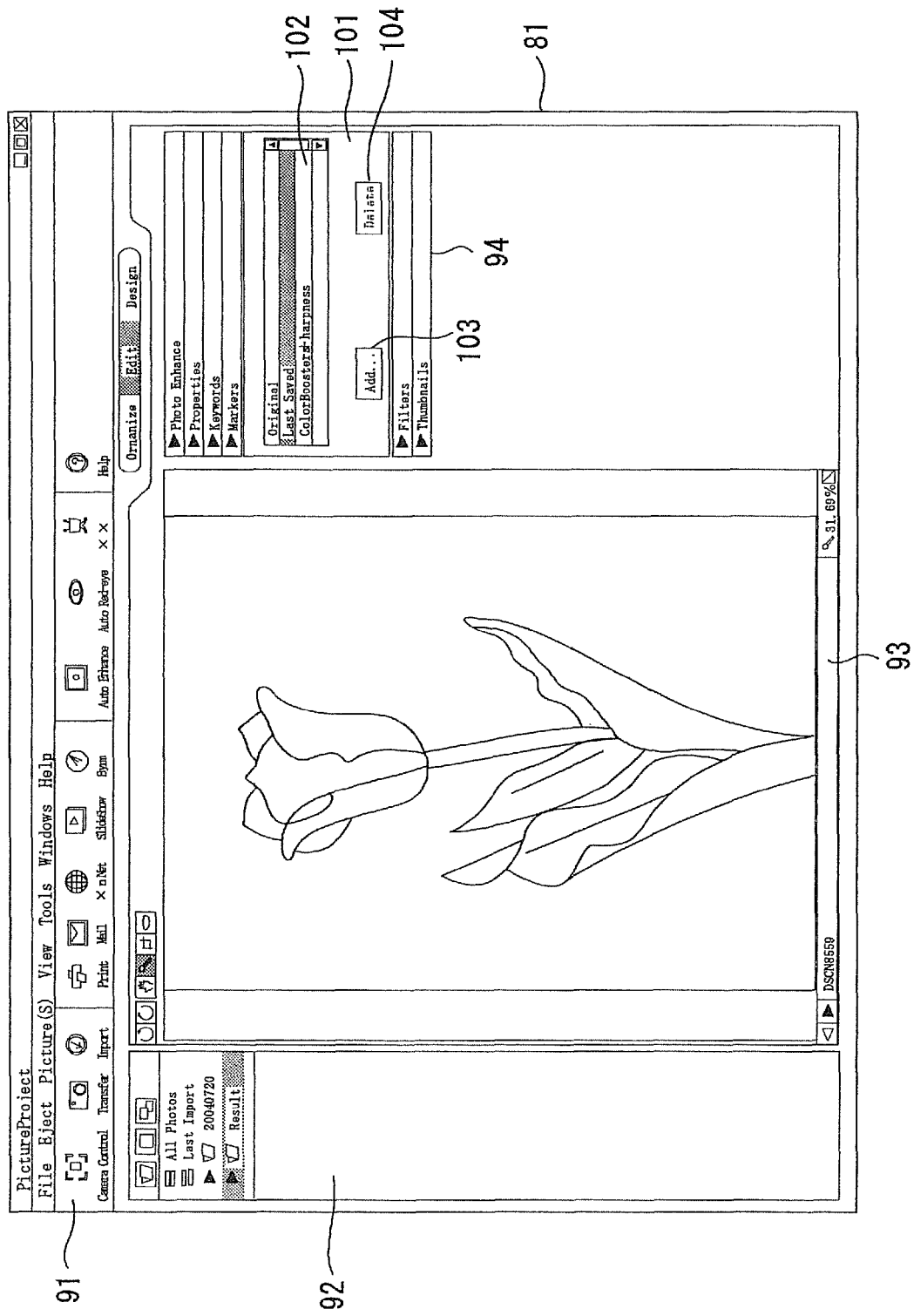
FIG. 3 is a diagram for explaining a display window.

The window display control unit 62 controls the display of a display window 81 indicated on the screen of the output unit 17 as shown in FIG. 3 based on the data supplied from the image display control unit 60 and the marker data display control unit 61.

The display window 81 depicted in FIG. 3 is composed of a tool bar 91, a file selection area 92, an image display area 93 and an operational input area 94.

As a result of the user selecting a desired mark, the tool bar 91 displays various menus corresponding to such mark. The file selection area 92 is an area which displays graphics representing the layered system of the folders or files such that the image data file to be opened can be selected when the user commands the opening of the image data file. The image display area 93 is an area for displaying an image in which the display thereof is controlled based on the opened image data file, or an image corresponding to the image data being edited. The operational input area 94 is to be operated by the user upon making various operational inputs, and menus and command tool bars are arranged therein.

A marker display area 101 additionally may be displayed in the operational input area 94. The marker display area 101 contains a list box 102, an Add button 103 and a Delete button 104.

Displayed in the list box 102 is information corresponding to the editing state(s) selectable by the user, as well as the markers contained in the image data file. At the point in time when an image data file is selected and displayed, in the list box 102 of the marker display area 101, only the text "original" is displayed without any marker being displayed. Alternatively, in addition to "original", text representing a plurality of markers and "Last Saved", which is a marker corresponding to the process when this image data was saved, are displayed. Further, when the user thereafter engages in an editing operation and a command and parameter are extracted with the command and parameter extraction unit 55 and a new process is saved in the process storage unit 56, a marker "current" corresponding to the current process is additionally displayed in the list box 102 of the marker display area 101.

Information, including markers, corresponding to the editing state(s) selectable by the user may be indicated as text showing the command name of the implemented process as shown in the list box 102 of FIG. 3 ("Color Booster+sharpness"), or a symbol corresponding to the command name. Further, for example, the markers saved as Marker 1, Marker 2 . . . may be displayed as text distinguishable with numbers or the like, or this may be displayed in a format other than text such as with icons or image data representing the markers.

The Add button 103 is a button to be selected by the user when the user wishes to save the current editing state as a marker. The Delete button 104 is a button to be selected by the user when such user wishes to delete the saved marker selected in the list box 102.

Next, the processing is explained for a case, for example, where the setting is made to display the edited image at the point of time it was saved upon opening the image data file.

The image processing unit 57 acquires the original data saved in the original data storage unit 53. The marker storage unit 54 supplies to the image processing unit 57 and the marker data display control unit 61 the supplied marker information.

The marker data display control unit 61 creates data corresponding to the text data to be displayed on the list box 102 of the marker display area 101, and supplies this to the window display control unit 62.

The image processing unit 57 performs image processing to the supplied original data by employing the command and parameter corresponding to the process described in the marker corresponding to the current process at the point in time it was saved, creates image data at the point in time it was saved, and supplies this to the image display control unit 60.

Figure 4:
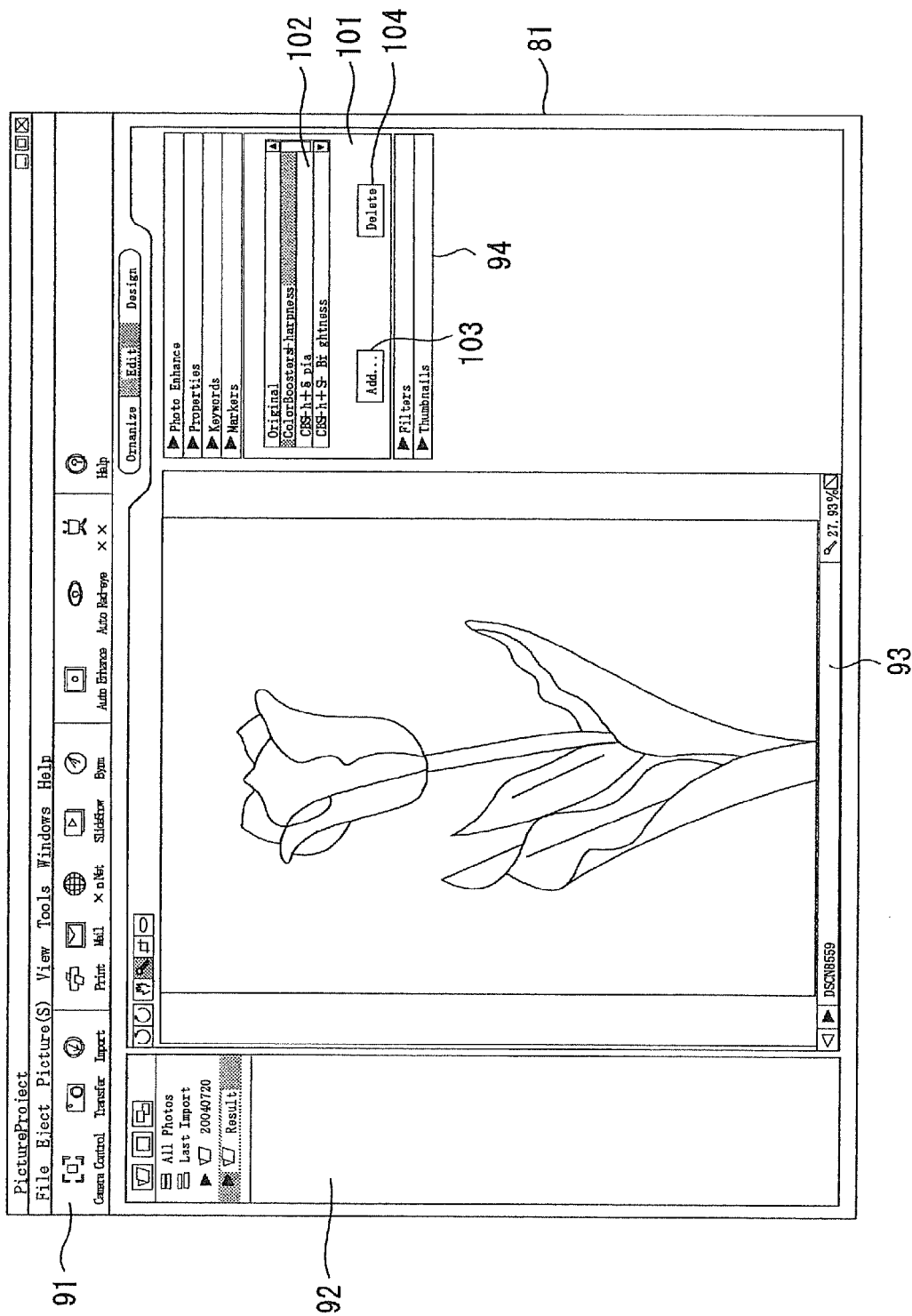
FIG. 4 is a diagram for explaining the display window.

The window display control unit 62 controls the display such that the display window 81 indicated on the screen of the output unit 17 is displayed, for example, as shown in FIG. 4 based on the data supplied from the image display control unit 60 and the marker data display control unit 61.

In FIG. 4, the constitution of the tool bar 91, file selection area 92, image display area 93 and operational input area 94 is the same as the constitution explained with reference to FIG. 3, but the image displayed on the image display area 93 is image data at the point in time it was saved. Therefore, "Last Saved" corresponding to the current process when this image data was saved does not have to be displayed in the marker display area 101.

Next, the processing is explained for a case, for example, where the setting is made to display the image data in a state of having been subject to the processing corresponding to all markers contained in the original data file as thumbnail images on the same window upon opening the image data file.

The image processing unit 57 acquires the original data saved in the original data storage unit 53. The marker storage unit 54 supplies to the image processing unit 57 and the marker data display control unit 61 the supplied marker information.

The marker data display control unit 61 creates data corresponding to the text data to be displayed on the list box 102 of the marker display area 101, and supplies this to the window display control unit 62.

The image processing unit 57 performs image processing to the supplied original data by employing the command and parameter corresponding to the process described in the respective markers, creates image data corresponding to the editing state at the point in time the respective markers were saved, and supplies this to the thumbnail image display control unit 59 together with the original data. The thumbnail image creation unit 59 creates thumbnail image data based on the supplied image data, and supplies this to the image display control unit 60. The image display control unit 60 determines the arrangement of the thumbnail images in the image display area 93, and supplies to the window display control unit 62 the data corresponding to the display image of the image display area 93.

Figure 5:
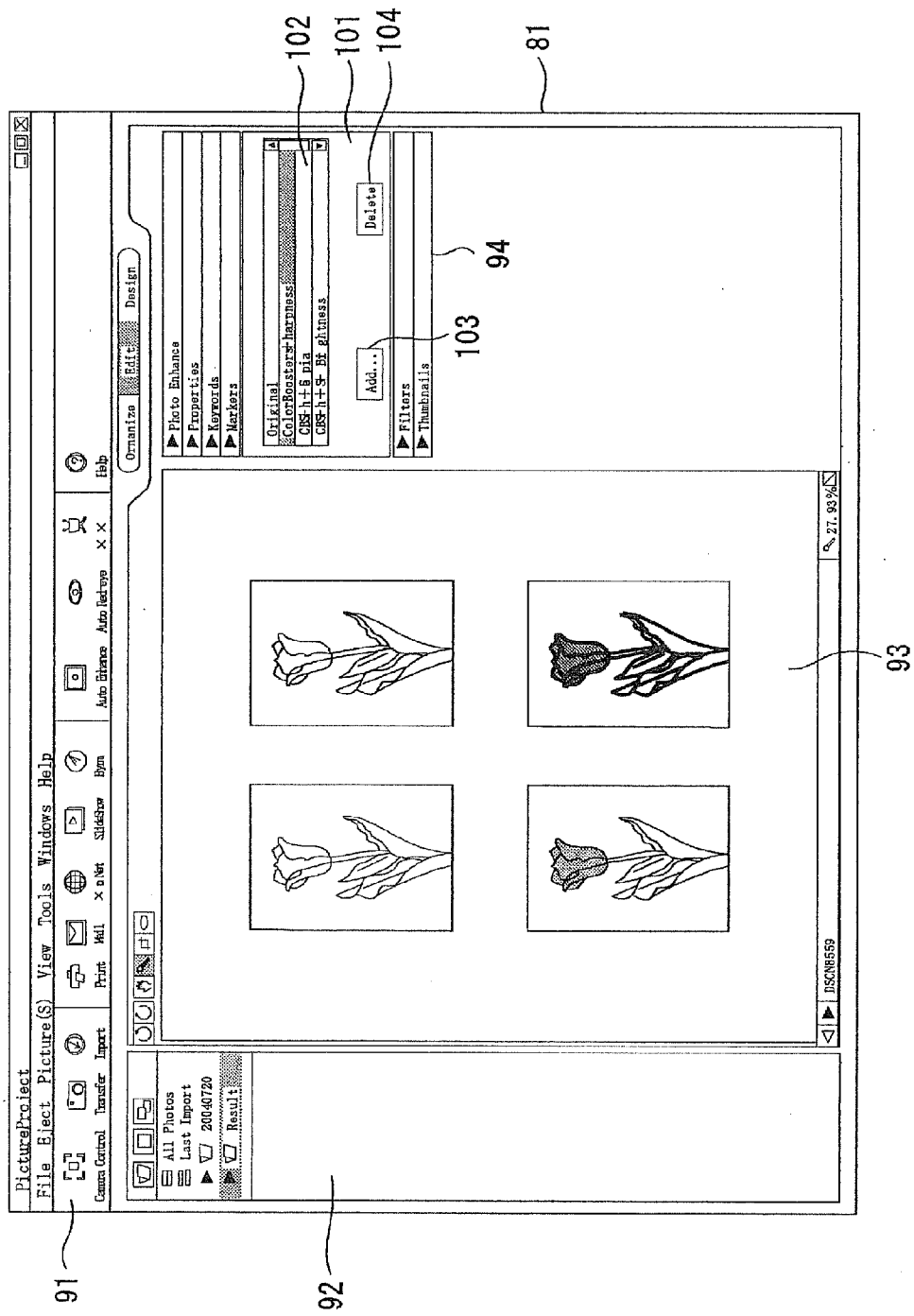
FIG. 5 is a diagram for explaining a case of displaying a plurality of thumbnail images on the display window.

The window display control unit 62 controls the display such that the display window 81 indicated on the screen of the output unit 17 is displayed, for example, as shown in FIG. 5 based on the data supplied from the image display control unit 60 and the marker data display control unit 61.

In FIG. 5, the constitution of the tool bar 91, file selection area 92, image display area 93 and operational input area 94 is the same as the constitution explained with reference to FIG. 3, but thumbnail images corresponding to the original data as well as the edited image data corresponding to all markers are displayed on the image display area 93.

Next, the processing is explained for a case, for example, where the setting is such that the image data in a state of having been subject to the processing corresponding to all markers contained in the original data and image data file is concurrently displayed as the ordinary image, and thumbnail images on the same window upon opening the image data file.

The image processing unit 57 acquires the original data saved in the original data storage unit 53. The marker storage unit 54 supplies to the image processing unit 57 and the marker data display control unit 61 the supplied marker information.

The marker data display control unit 61 creates data corresponding to the text data to be displayed on the list box 102 of the marker display area 101, and supplies this to the window display control unit 62.

The image processing unit 57 performs image processing to the supplied original data by employing the command(s) and parameter(s) corresponding to the process described in the respective markers, creates image data corresponding to the editing state at the point in time the respective markers were saved, and, among the original image and edited image data, supplies the image data to be displayed as thumbnail images to the thumbnail image creation unit 59, and supplies the image data to be displayed as the ordinary image to the image display control unit 60. The thumbnail image creation unit 59 creates thumbnail image data based on the supplied image data, and supplies this to the image display control unit 60. The image display control unit 60 determines the arrangement of the thumbnail images and the ordinary image in the image display area 93, and supplies to the window display control unit 62 the data corresponding to the display image of the image display area 93.

Figure 6:
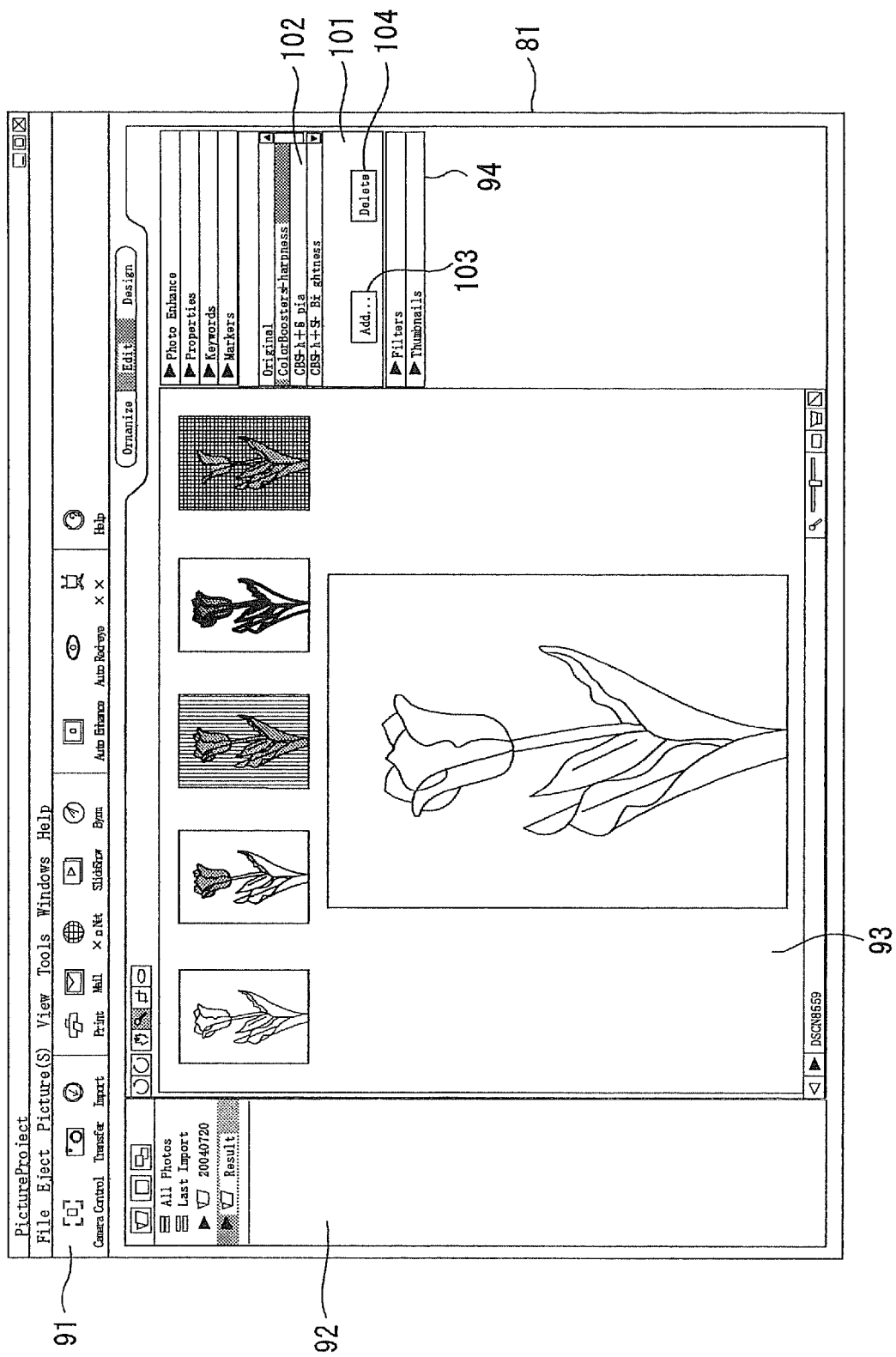
FIG. 6 is a diagram for explaining a case of concurrently displaying an ordinary image and thumbnail images on the display window.

The window display control unit 62 controls the display such that the display window 81 indicated on the screen of the output unit 17 is displayed, for example, as shown in FIG. 6 based on the data supplied from the image display control unit 60 and the marker data display control unit 61.

In FIG. 6, the constitution of the tool bar 91, file selection area 92, image display area 93 and operational input area 94 is the same as the constitution explained with reference to FIG. 3, but images corresponding to the original data as well as images corresponding to all markers are concurrently displayed on the image display area 93 as an ordinary image and as thumbnail images, respectively. Regarding which image is to be displayed as the ordinary image, this may be set in advance, or the image corresponding to the original image data or edited image data at the point in time it was saved may be displayed as the ordinary image, and the other images may be displayed as thumbnail images. In addition, all image data may be displayed as thumbnail images, and an image corresponding to a thumbnail image selected by the user among such thumbnail images may be displayed as the ordinary image.

Further, when a thumbnail image shown in FIG. 5 or FIG. 6 is selected and an operational input is made for deleting such thumbnail image, the marker corresponding to the deleted thumbnail image also may be deleted from the marker storage unit 54.

Finally, the processing is explained for a case, for example, where the setting is such that a plurality of display windows 81 are indicated on the screen upon opening the image data file, and the image data in a state of having been subject to the processing corresponding to all markers contained in the image data file and the image corresponding to the original data are displayed on the image display area 93 of the respective display windows 81.

The image processing unit 57 acquires the original data saved in the original data storage unit 53. The marker storage unit 54 supplies to the image processing unit 57 and the marker data display control unit 61 the supplied marker information.

The marker data display control unit 61 creates data corresponding to the text data to be displayed on the marker display area 101, and supplies this to the window display control unit 62.

The image processing unit 57 performs image processing to the supplied original data by employing the command(s) and parameter(s) corresponding to the process described in the respective markers, creates image data corresponding to the editing state at the point in time the respective markers were saved, and supplies this to the image display control unit 60 together with the original image. The image display control unit 60 supplies to the window display control unit 62 the data corresponding to the display image of the respective image display areas 93 of the plurality of display windows 81, and supplies this to the window display control unit 62.

Figure 7:
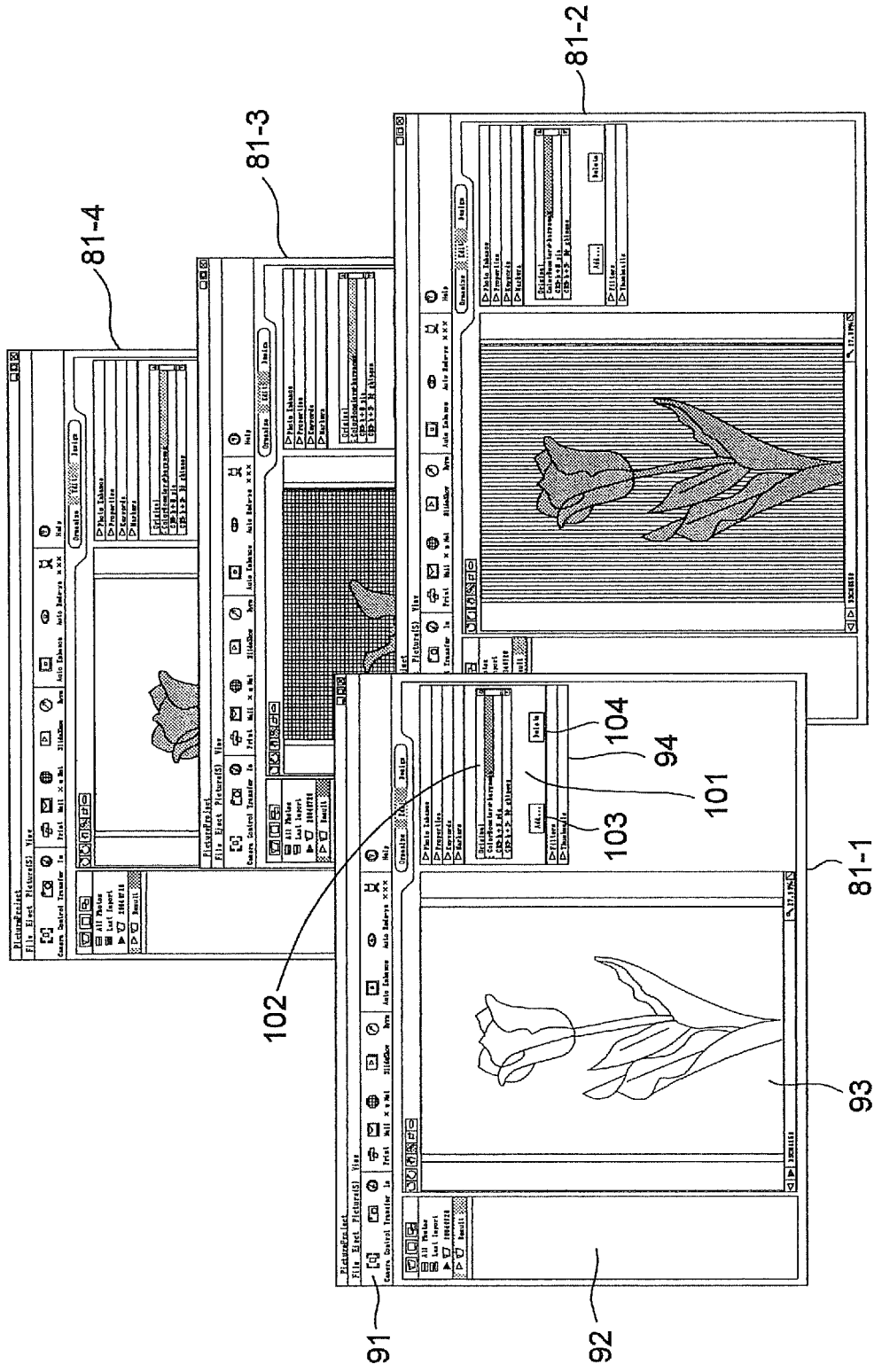
FIG. 7 is a diagram for explaining a case of displaying a plurality of display windows.

The window display control unit 62 controls the display such that the plurality of display windows 81 indicated on the screen of the output unit 17 is displayed, for example, as shown in FIG. 7 based on the data supplied from the image display control unit 60 and the marker data display control unit 61. FIG. 7 illustrates a case of indicating four display windows 81.

The constitution of the tool bar 91, file selection area 92, image display area 93 and operational input area 94 in the respective windows 81-1 to 81-4 depicted in FIG. 7 is the same as the constitution explained with reference to FIG. 3, and images corresponding to the original data or the edited image data corresponding to one of the markers are individually displayed on the respective image display areas 93. The user may select any one of the plurality of display windows 81-1 to 81-4 as the active window, and commence editing processing thereof.

By referring to the images displayed on the image display area 93 of the display window 81 explained with reference to FIG. 3 to FIG. 7, the user can input the command and parameter for editing the image.

The command and parameter extraction unit 55 extracts a process containing at least one command and its (their) associated parameter(s) from the operational input of the user acquired with the operational input acquisition unit 51, and supplies this to the image processing unit 57 and to the process storage unit 56. The image processing unit 57 creates display image data based on the supplied process. Display of the created display image data on the image display area 93 is controlled with the processing of the image display control unit 60 and the window display control unit 62.

The process applied to the original data is saved in the process storage unit 56 in chronological order. In addition, when the user commands the storage of a marker, the process saved in the process storage unit 56 at that point in time, that is, the current process, is saved as a marker in the marker storage unit 54.

Figure 8:
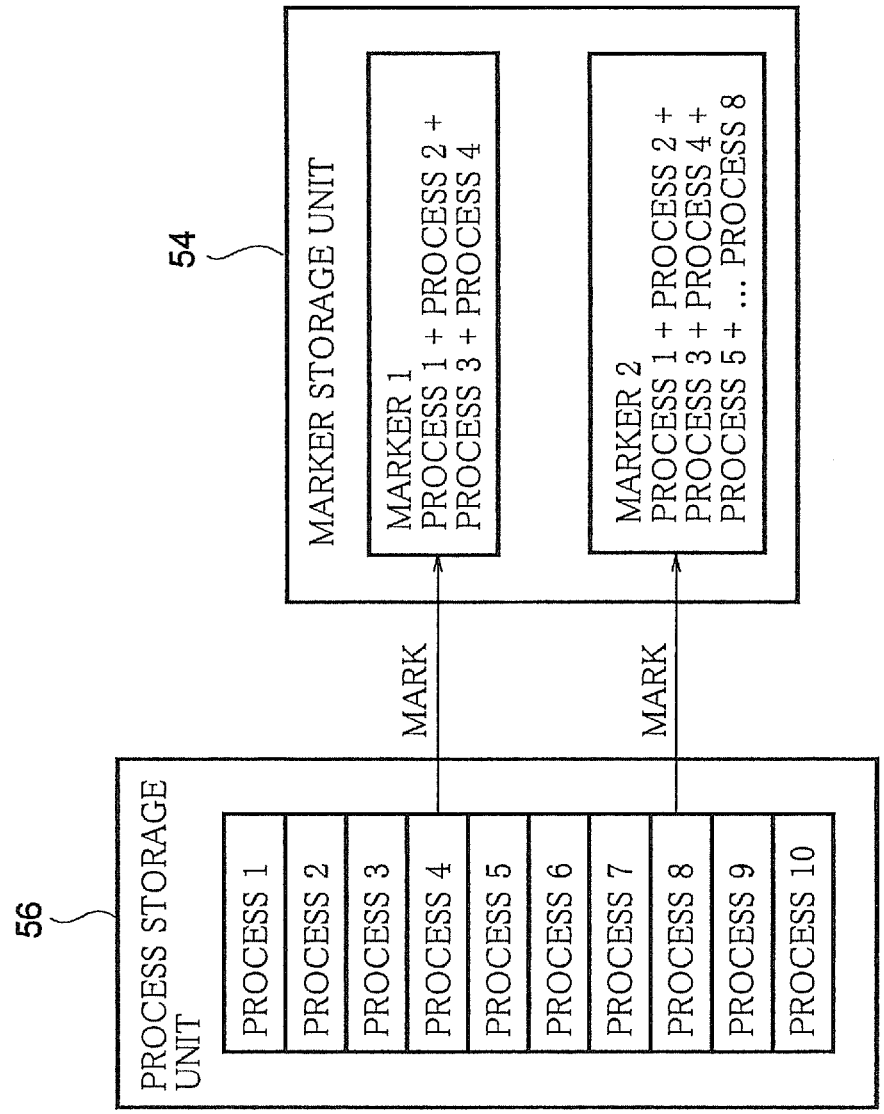
FIG. 8 is a diagram for explaining the saving of markers.

For example, as shown in FIG. 8, in a case where the storage of the marker is commanded during the input of Process 1 to Process 4, Process 1 to Process 4 will be saved in the marker storage unit 54 as Marker 1. In addition, after marker 1 has been stored, in a case where Process 4 to Process 8 are input and the storage of the marker is commanded while Process 1 to Process 8 are being saved as the current process, Process 1 to Process 8 will be saved as Marker 2 in the marker storage unit 54. Furthermore, Process 1 to Process 10, including Process 9 and Process 10 which were input after the Marker 2 has been saved, are saved as the current process in the process storage unit 56.

When the user selects any one of the saved markers and commands the display of an image in an edited state corresponding to such marker, the image processing unit 57 acquires the data of the marker selected by the user from the marker storage unit 54, performs image processing to the original data acquired from the original data storage unit 53 by employing the command and parameter corresponding to the marker, creates an image data corresponding to the image to be displayed, and supplies this to the image display control unit 60. The image display control unit 60 supplies to the window display control unit 62 the image data corresponding to the image to be displayed on the image display area 93, and the window display control unit 62 controls the display of the image in an edited state corresponding to the selected marker on the image display area 93.

When the command and parameter extraction unit 55 extracts the command(s) and parameter(s) based on the operational input of the user acquired with the operational input acquisition unit 51 after the image data having been subject to the processing of the command(s) and parameter(s) corresponding to the selected marker is created and the corresponding edited image is displayed on the image display area 93, the process storage unit 56 resets the current process currently being saved to a state corresponding to the marker selected by the user, and thereafter saves the newly input command and parameter as a process. The marker saved in the marker storage unit 54 is not changed.

Figure 9:
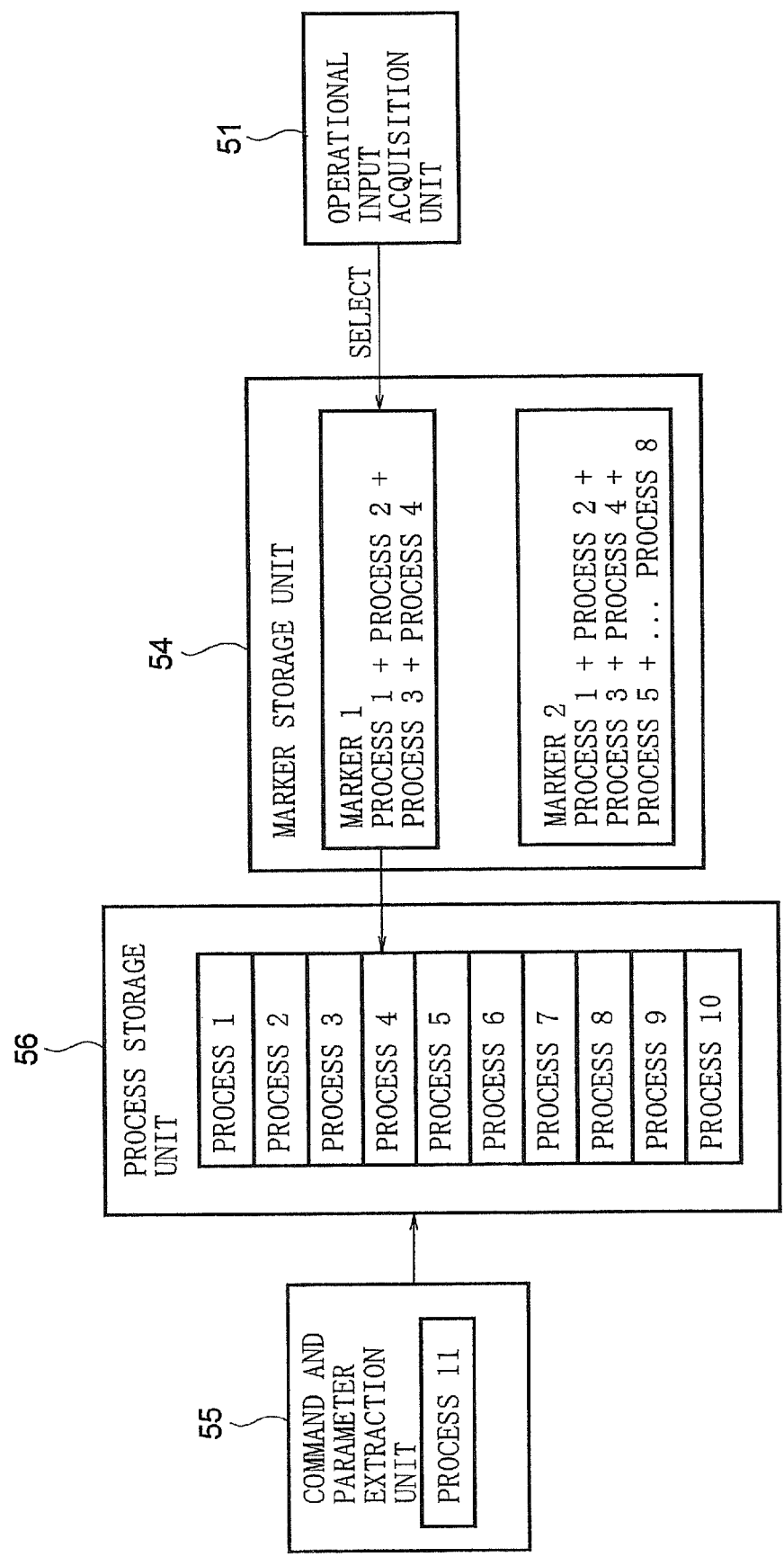
FIG. 9 is a diagram for explaining the selection of a marker and saving of the current process.
Figure 10:
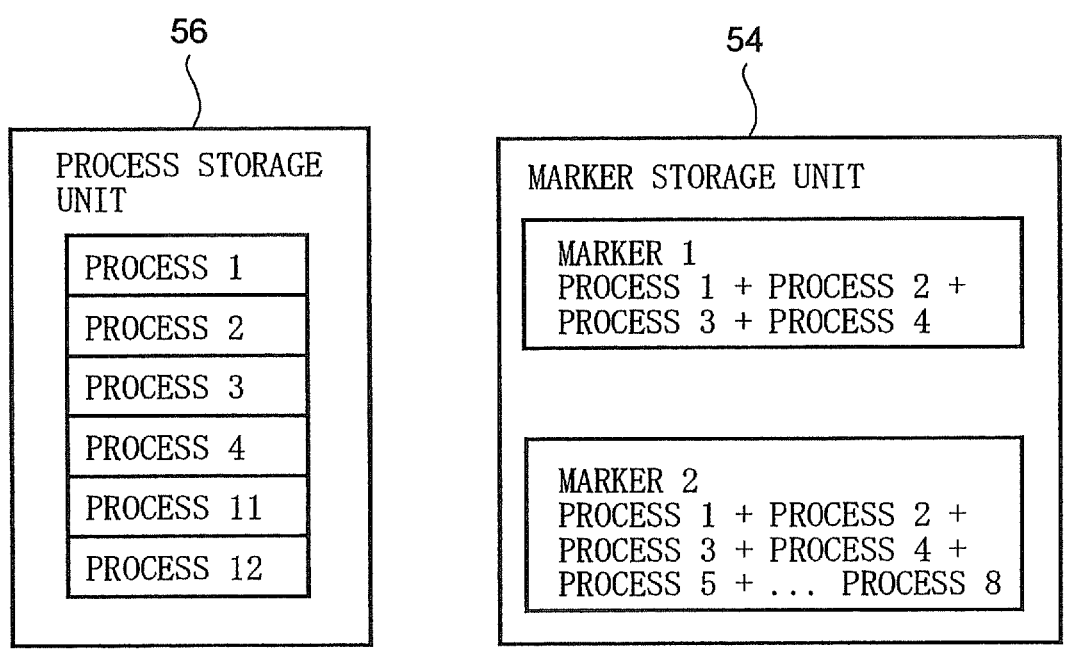
FIG. 10 is a diagram for explaining the selection of a marker and saving of the current process.

An example of this is described with respect to FIGS. 9 and 10. As shown in FIG. 9: (1) Process 1 to Process 10 are saved in the process storage unit 56, (2) the selection by the user of the saved Marker 1 is notified from the operational input acquisition unit 51, and (3) the Process 11 subsequently has been input after the image data in which the command(s) and parameter(s) of Process 1 to Process 4 (corresponding to Marker 1) has been applied to the original data is created and the corresponding image is displayed. Then, as shown in FIG. 10, Process 1 to Process 4 corresponding to Marker 1, Process 11 input thereafter, and a subsequent process, for example, Process 12, are saved as the current process in the process storage unit 56. (Thus, as mentioned in the preceding paragraph, the contents of process storage unit 56 is reset.) Pursuant to the processing of the image processing unit 57, image data in which image processing is performed to the original data by employing the command(s) and parameter(s) corresponding to the current process is created, and the image corresponding to the created image data is displayed on the image data display area 93 of the display window 81.

Figure 11:
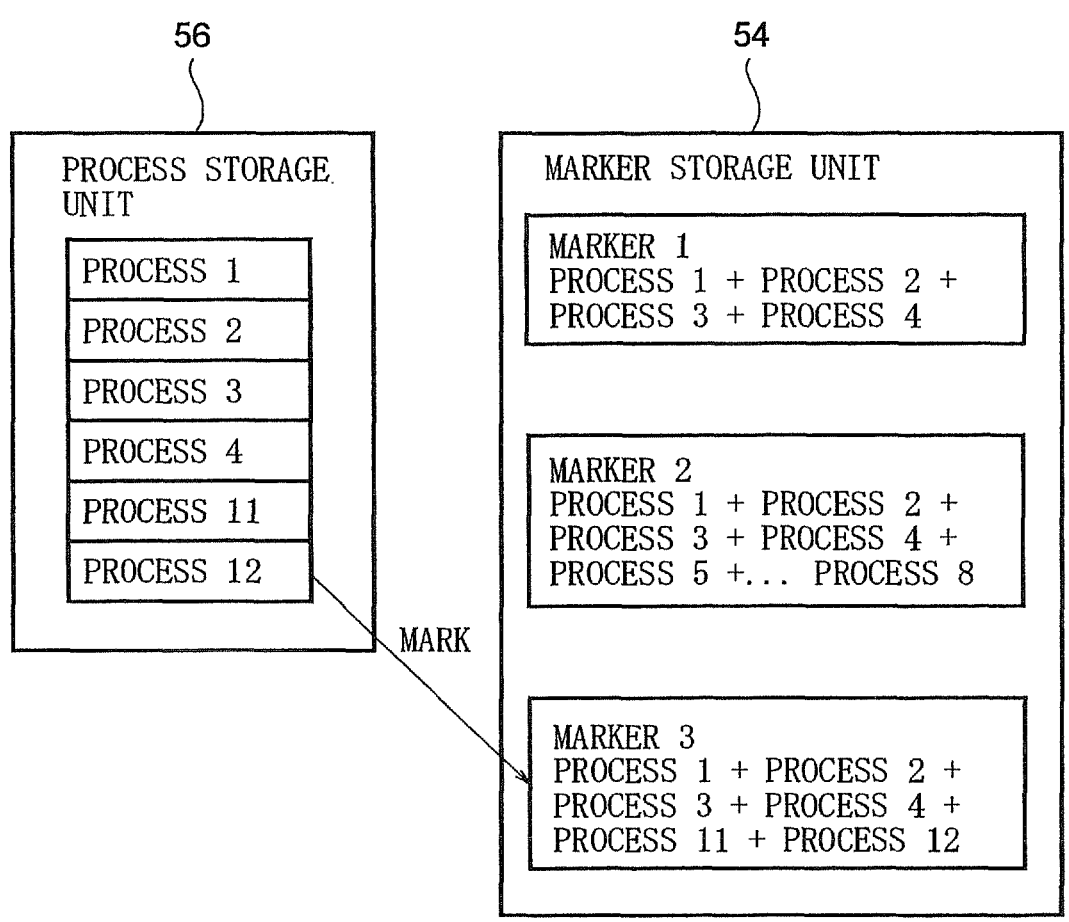
FIG. 11 is a diagram for explaining the saving of a new marker.

In addition, when the storage of the marker is commanded in this state, as shown in FIG. 11, Process 1 to Process 4 as the current process, as well as Process 11 and Process 12 are saved as Marker 3 in the marker storage unit 54. Since the marker storage unit 54 supplies the updated marker data to the marker data display control unit 61, the display of the list box 102 of the marker display area 101 is updated pursuant to the processing of the marker data display control unit 61 and the window display control unit 62.

Figure 12:
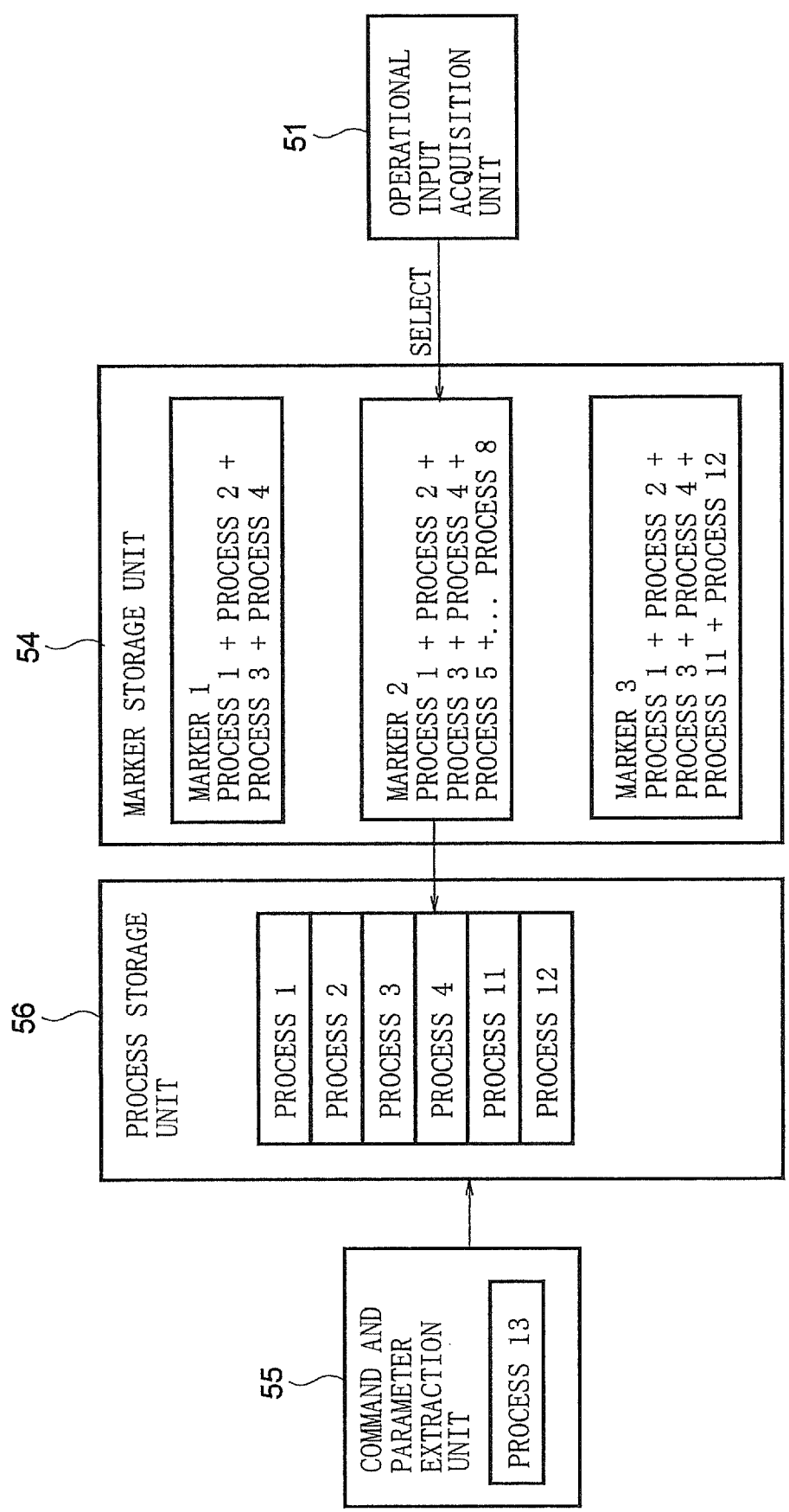
FIG. 12 is a diagram for explaining the selection of a marker and saving of the current process.
Figure 13:
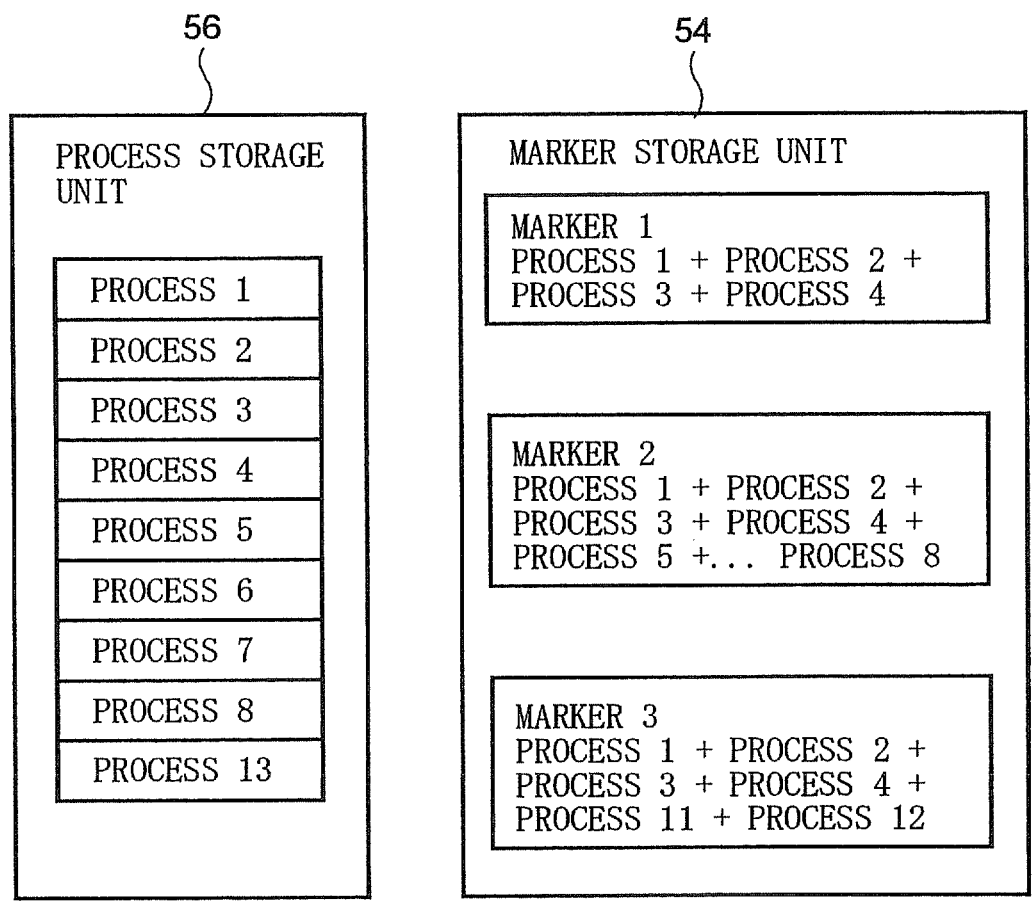
FIG. 13 is a diagram for explaining the selection of a marker and saving of the current process.

Thereafter, as shown in FIG. 12, in a state where Processes 1 to 4 as well as Process 11 and Process 12 are saved in the process storage unit 56, when the selection by the user of the saved Marker 2 is notified from the operational input acquisition unit 51, and the Process 13 subsequently has been input after the image data in which the command(s) and parameter(s) of Process 1 to Process 8 (corresponding to Marker 2) have been applied to the original data is created and the corresponding image is displayed, then as shown in FIG. 13, Process 1 to Process 8 corresponding to Marker 2 and subsequent Process 13 are saved as the current process in the process storage unit 56. Pursuant to the processing of the image processing unit 57, image data to be displayed in which image processing is performed to the original data by employing the command(s) and parameter(s) corresponding to the current process is created, and the image corresponding to the created image data is displayed on the image data display area 93 of the display window 81.

As described above, in addition to being able to command the storage of the marker in an arbitrary editing state, the user also is able to call up the editing state saved as the marker.

Further, when the setting is such that the image corresponding to the image data in a state of having been subject to the processing corresponding to all markers contained in the image data file is to be displayed upon opening the image data file, the user may select the image displayed on a plurality of display windows 81 or an image data in one's desired editing state upon referring to the plurality of thumbnail images displayed on the image display area 93 as described with reference to FIG. 5 to FIG. 7. That is, the user is able to input the command(s) and parameter(s) for additionally editing the selected image data by clicking the thumbnail image corresponding to the image data of one's desired editing state, or activating the display window 81 on which the image data of one's desired editing state is displayed.

In other words, when the image displayed on the plurality of display windows 81 or an image among the plurality of thumbnail images displayed on the image display area 93 is selected, and the command(s) and parameter(s) are input, the process corresponding to the selected image data and the newly input command(s) and parameter(s) are saved in the process storage unit 56 as the current process corresponding to the image data being edited.

Figure 14:
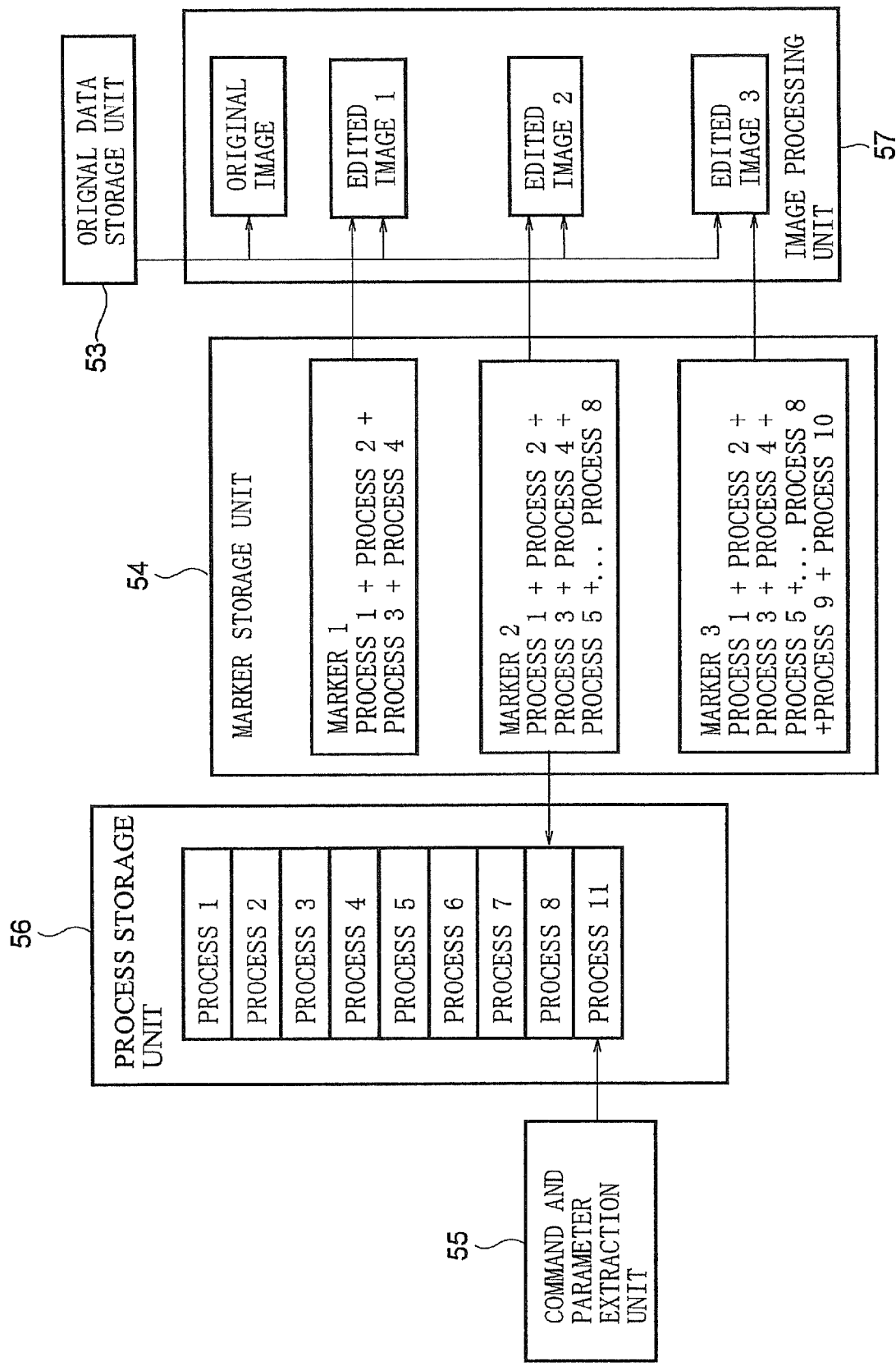
FIG. 14 is a diagram for explaining the display of a plurality of edited images employing markers.

FIG. 14 shows an example of this. As shown in FIG. 14, the markers saved in the marker storage unit 54 are Marker 1 corresponding to Process 1 to Process 4, Marker 2 corresponding to Process 1 to Process 8, and Marker 3 corresponding to Process 1 to Process 10. The image data to be displayed created with the image processing unit 57, that is, the image to be displayed on the plurality of display windows 81 or the plurality of thumbnail images to be displayed on the image display area 93 are the original image, Edited Image 1 in which the command(s) and parameter(s) corresponding to Marker 1 has been applied to the original image, Edited Image 2 in which the command(s) and parameter(s) corresponding to Marker 2 has been applied to the original image, and Edited Image 3 in which the command(s) and parameter(s) corresponding to Marker 3 has been applied to the original image. When the user selects Edited Image 2 among the above and inputs a new process, the newly input Process 11 extracted with the command and parameter extraction unit 55 is added to Process 1 to Process 8 corresponding to Marker 2 saved in the marker storage unit 54, and all of this is stored in the process storage unit 56 as the current process. Then, the image processing unit 57 creates image data in which the process corresponding to Marker 2 saved in the marker storage unit 54 and the newly input Process 11 extracted with the command and parameter extraction unit 55 are applied to the original data saved in the original data storage unit 53, and the image corresponding to this created image data is displayed on the image display area 93 of the display window 81 pursuant to the processing of the image display control unit 60 and the window display control unit 62.

Figure 15:
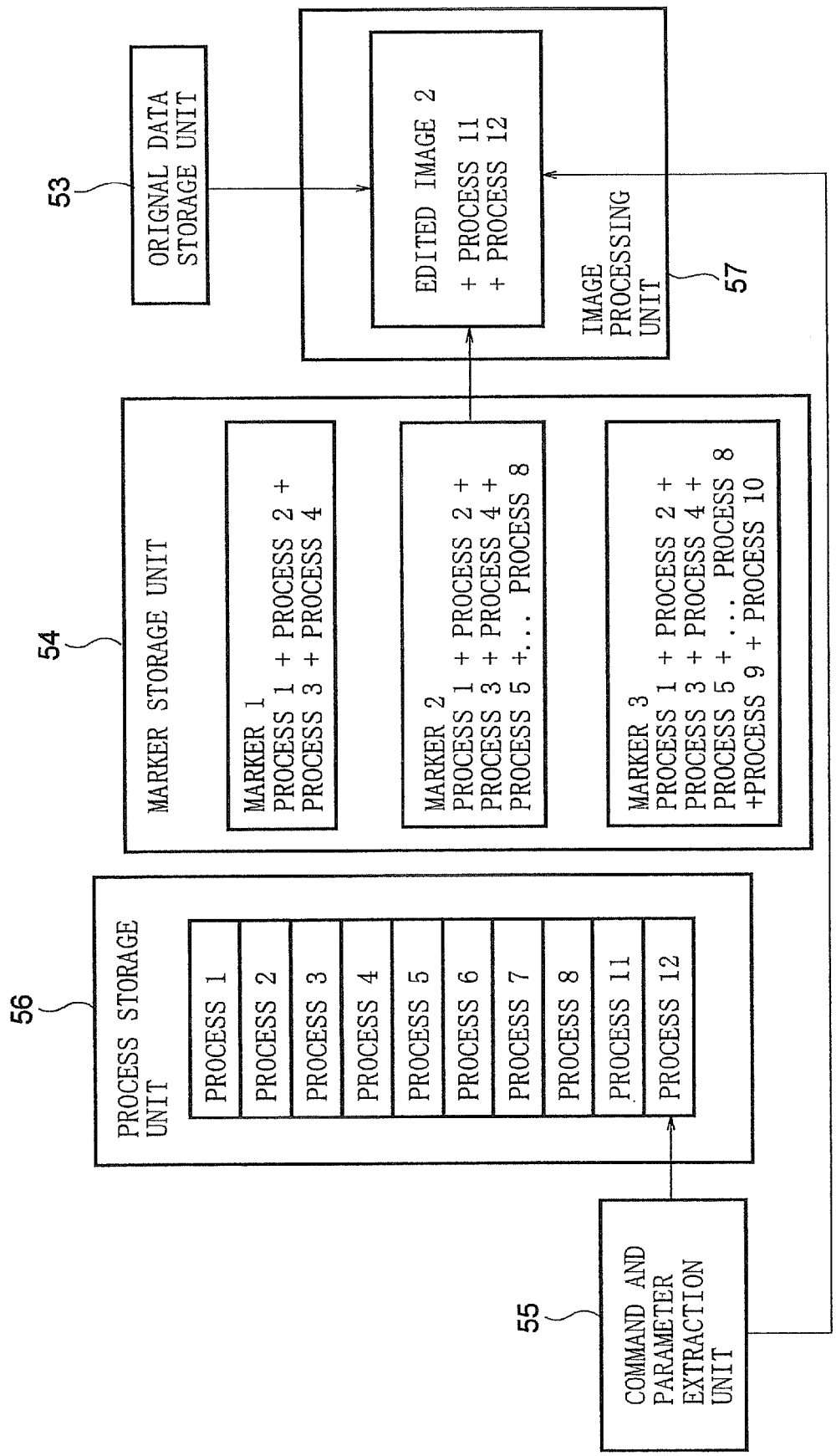
FIG. 15 is a diagram for explaining the processing when a desired edited image is selected from the plurality of edited images employing a marker.

In addition, as shown in FIG. 15, when Process 12, which is a new process, is input, the process storage unit 56 additionally adds Process 12 to the current process, and the image processing unit 57 updates the display image data with Process 12 extracted with the command and parameter extraction unit 55.

Figure 16:
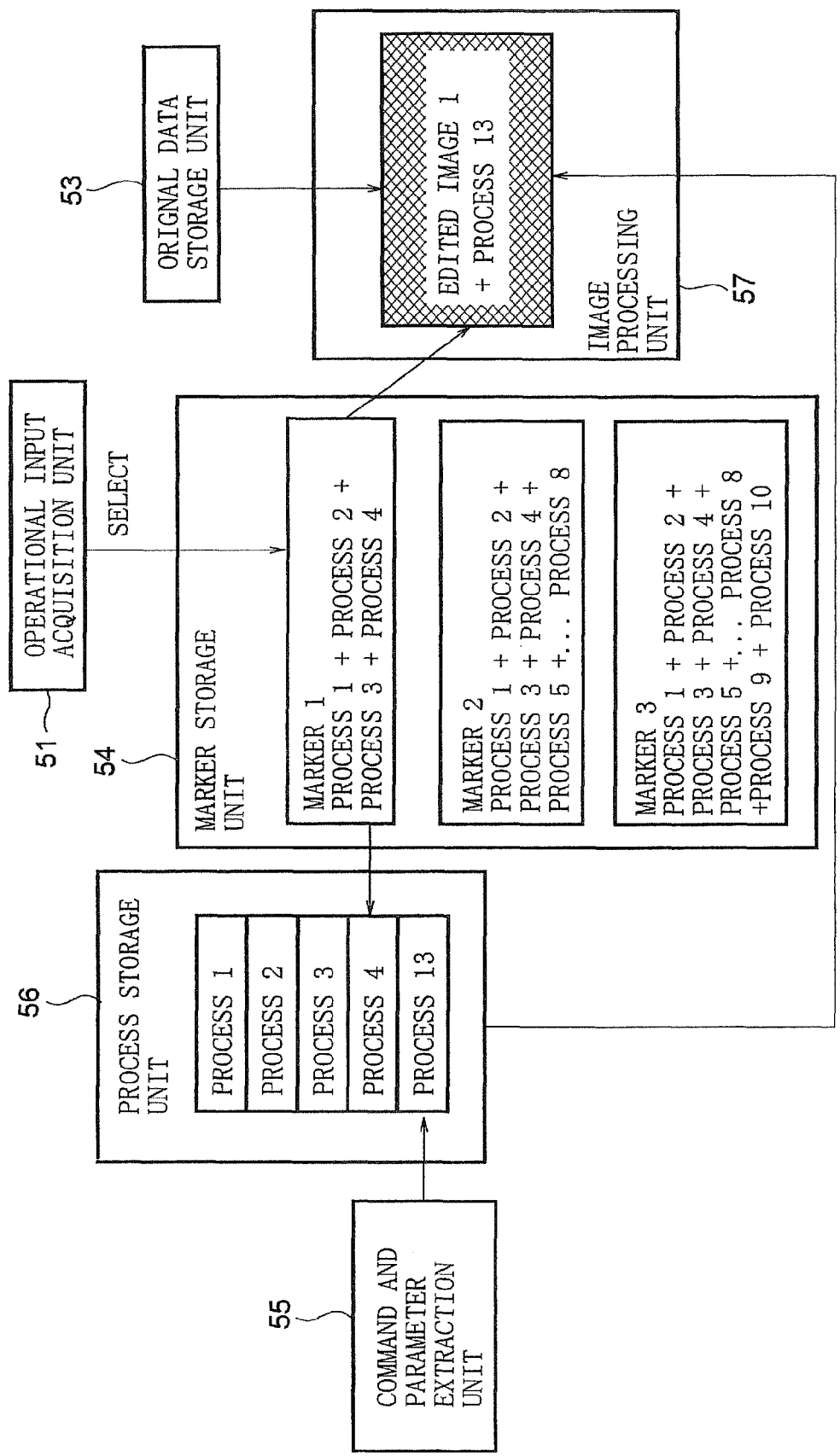
FIG. 16 is a diagram for explaining the selection of a marker and saving of the current process.

Thereafter, when the selection by the user of the saved Marker 1 is notified from the operational input acquisition unit 51, and the Process 13 subsequently has been input after the image data in which the command(s) and parameter(s) of Process 1 to Process 4 (corresponding to Marker 1) having been applied to the original data is created with the image processing unit 57 and the corresponding Edited Image 1 is displayed, as shown in FIG. 16, the process storage unit 56 will become a state in which Process 1 to Process 4 as well as Process 13 are being stored. In addition, the image processing unit 57 will update the displayed image data (of Edited Image 1) with Process 13 extracted with the command parameter extraction unit 55. Although the displayed image is updated as described above, the original data saved in the original data storage unit 53 is not updated.

Figure 17:
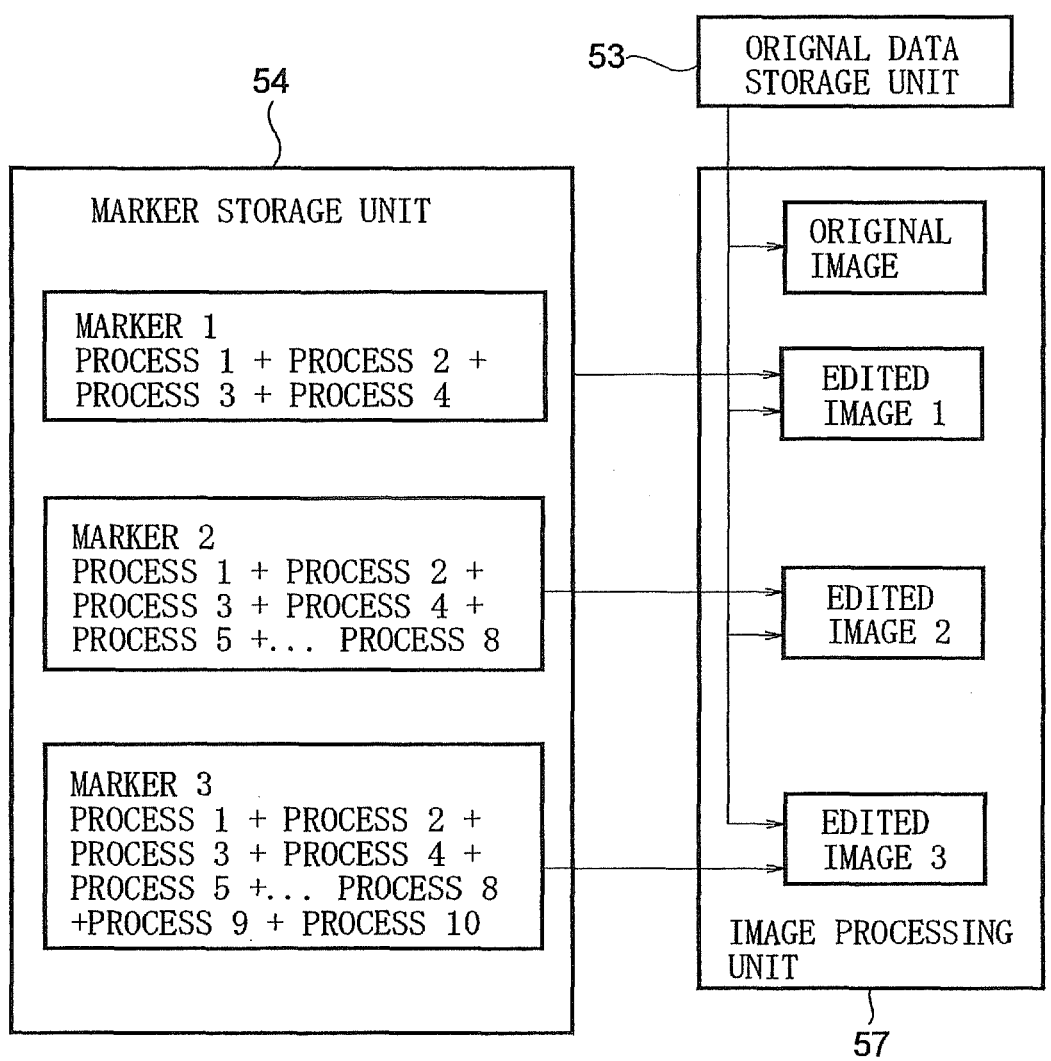
FIG. 17 is a diagram for explaining the display of a plurality of edited images employing markers.

Further, when the marker displayed in the marker display area 101 is selected and the display of an image is commanded, as shown in FIG. 17, the image processing unit 57 is able to create, regardless of the current process, the image data of an editing state corresponding to the marker selected by the user based on the marker selected by the user and saved in the marker storage unit 54 and the original data saved in the original data storage unit 53.

When a plurality of markers are selected by the user and the display of images is commanded, the image processing unit 57 is able to create a plurality of image data to be displayed based on the plurality of markers selected by the user and the original data saved in the original data storage unit 53. Here, the display of such plurality of created image data is similar to the case explained with reference to FIG. 5 to FIG. 7, and a plurality of thumbnail images may be displayed on a single image data display area 93, thumbnail images and an ordinary image may be concurrently displayed on a single image data display area 93, or a plurality of display windows 81 may be displayed.

Moreover, according to this image processing application program, a new image data file may be created with the marker data saved in the marker storage unit 54.

Figure 18:
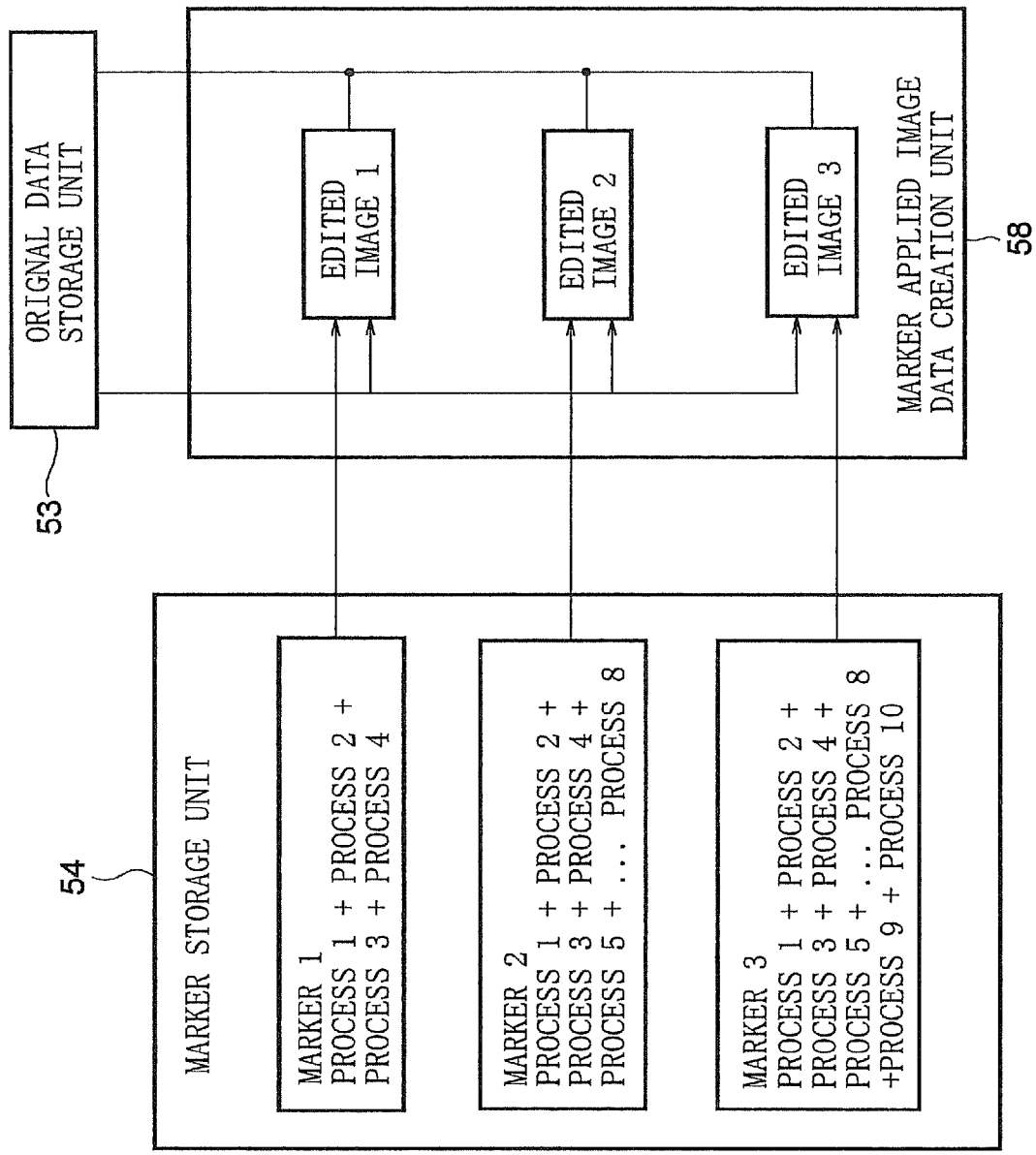
FIG. 18 is a diagram for explaining the creation of a plurality of new original data employing markers.

When the marker displayed in the list box 102 of the marker display area 101 and the creation of a new image data file is commanded, as shown in FIG. 18, the marker data applied image data creation unit 58 creates an image data corresponding to the editing state of the marker selected by the user as the original data of such new image data file based on the marker selected by the user and saved in the marker storage unit 54 and the original data saved in the original data storage unit 53, and saves this in the original data storage unit 53. Here, the new original data is given a new image data file name such that it can be distinguished from the other original data stored in original data storage unit 53.

When a plurality of markers are selected by the user and the creation of a new image data file is commanded, the marker data applied image data creation unit 58 is able to create and save in the original data storage unit 53 a plurality of image data corresponding to the editing state corresponding to the markers selected by the user as the original data of the new image data file based on the plurality of markers selected by the user and the original data saved in the original data storage unit 53. Here, the plurality of created original data is similar to the case explained with reference to FIG. 5 to FIG. 7, and a plurality of thumbnail images may be displayed on a single image data display area 93, thumbnail images and an ordinary image may be concurrently displayed on a single image data display area 93, or a plurality of display windows 81 may be displayed.

In addition, when the user commands the closing or storage of a desired image data file, the operational input acquisition unit 51 notifies the thumbnail image creation unit 59 that it received a command for closing or saving the image data file. The thumbnail image creation unit 59 acquires the latest edited image data created with the image processing unit 57, and creates thumbnail image data corresponding to the latest edited image data.

Figure 19:
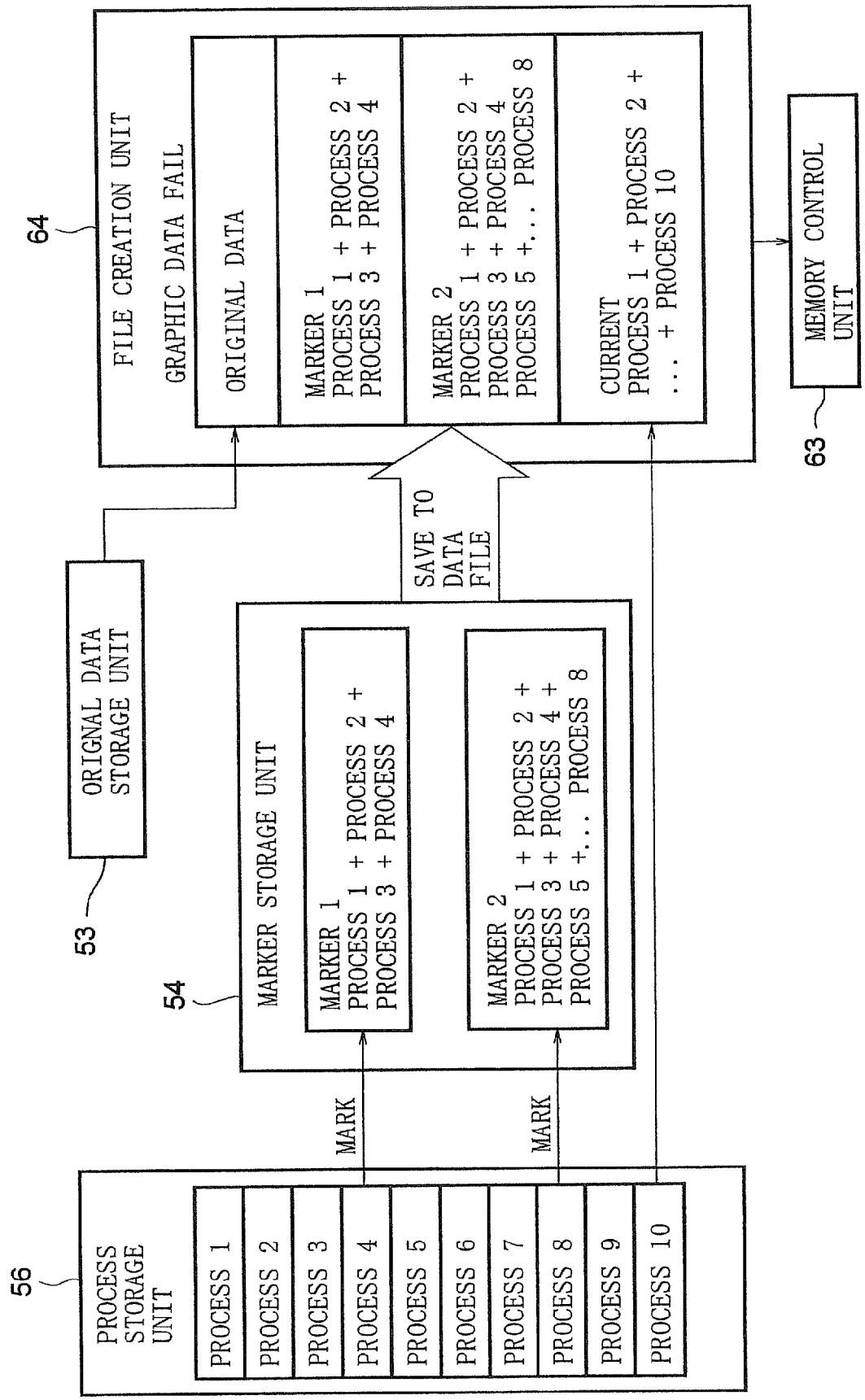
FIG. 19 is a diagram for explaining the saving of image data files.

In addition, the operational input acquisition unit 51 notifies the memory control unit 63 that it received the command for closing or saving the image data file. The memory control unit 63 controls the file creation unit 64 and makes it create the image data file to be saved. Thus, as shown in FIG. 19, the original data saved in the original data storage unit 53, the marker saved in the marker storage unit 54, the current process saved in the process storage unit 56, and the thumbnail images created with the thumbnail image creation unit 59 are supplied to the file creation unit 64, whereby a single image data file containing the original data, marker data, current process and thumbnail images corresponding to the latest edited image is created, supplied to the memory control unit 63, and, for example, storage in the memory unit 18 such as a hard disk or in the various storage media installed in the drive 20 is controlled.

Thumbnail image data may be included in the image data file to be saved.

Figure 20A:
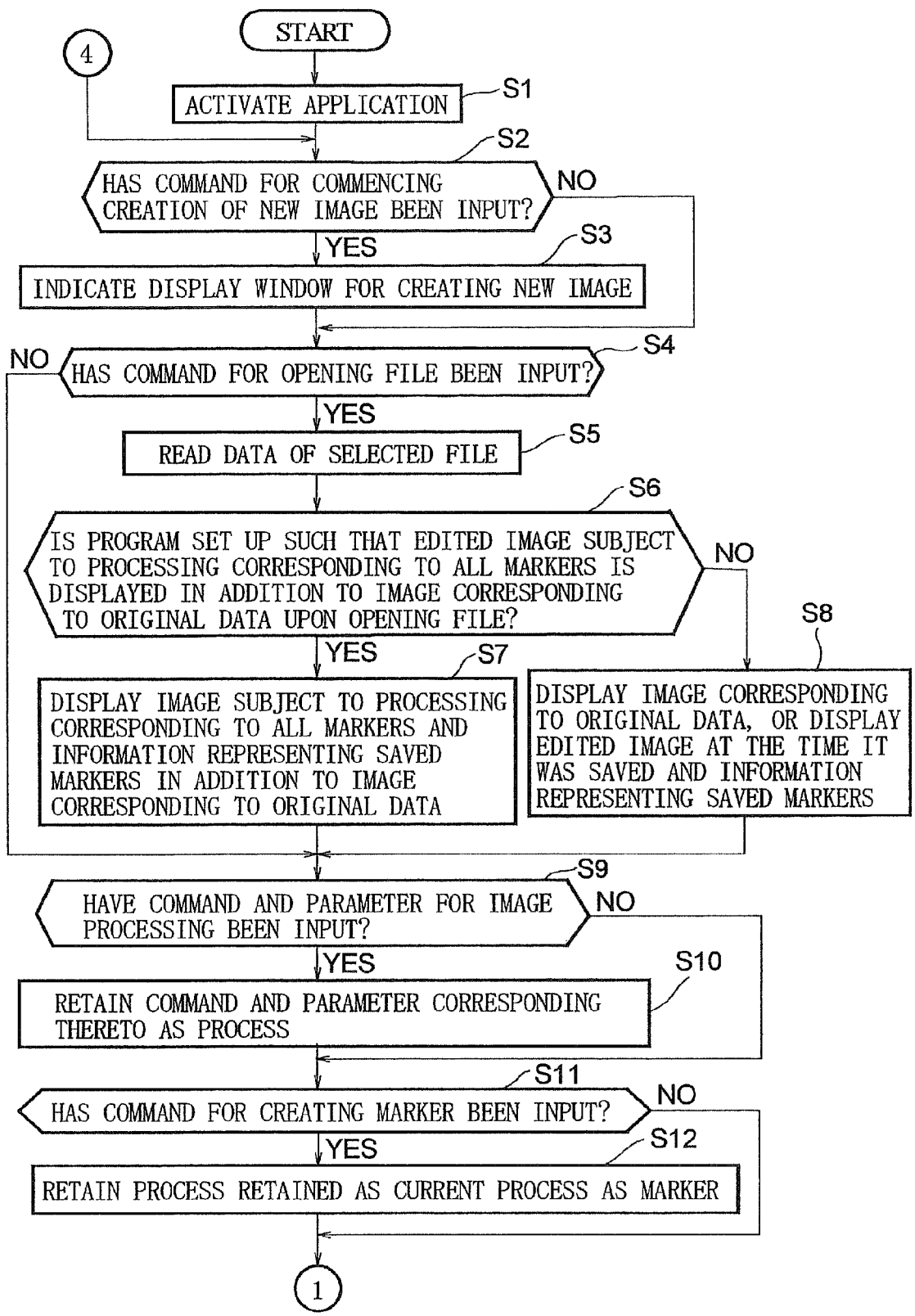
FIG. 20A is a flowchart for explaining processing executed by an image processing application program employing the present invention.
Figure 20B:
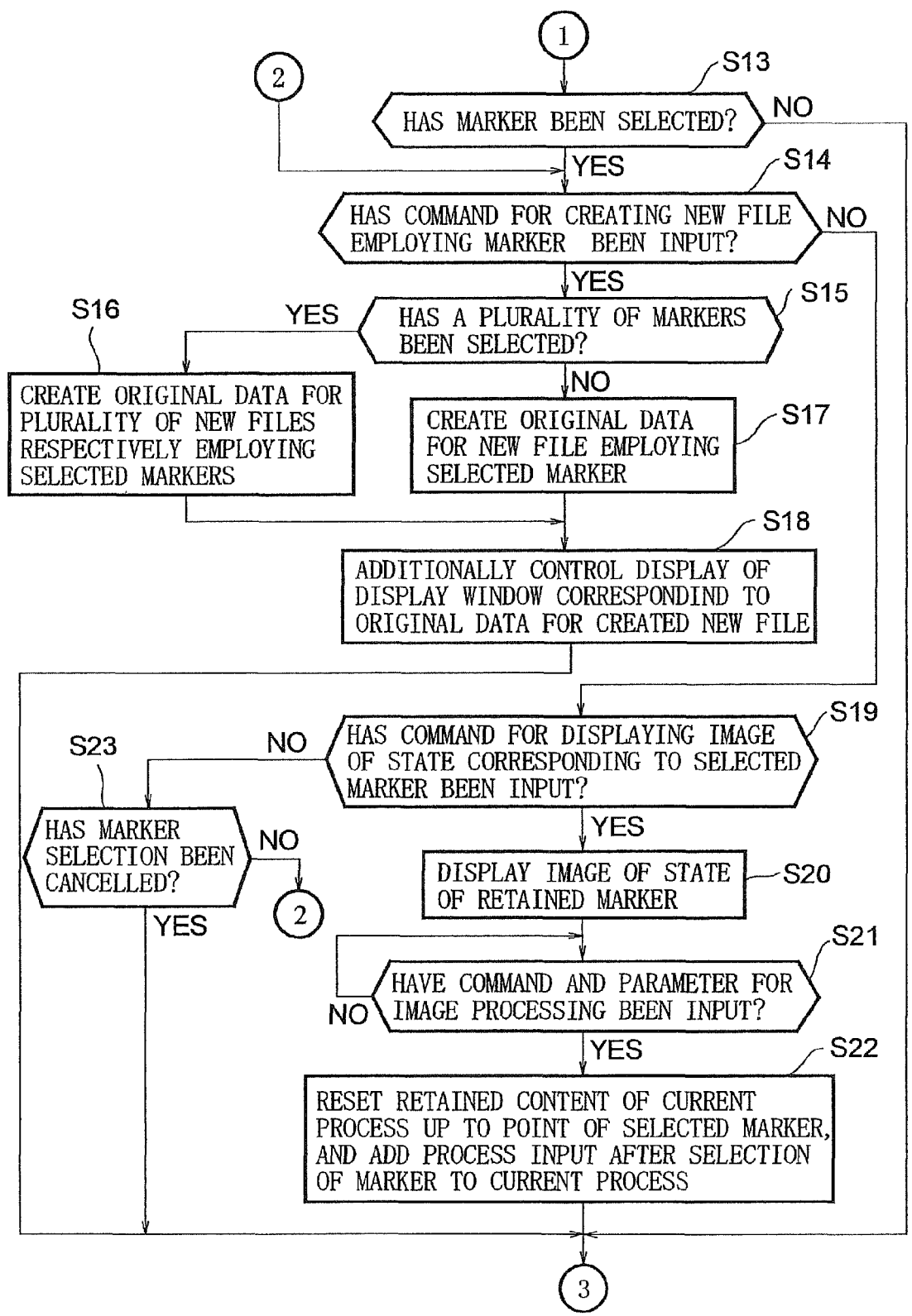
FIG. 20B is a flowchart for explaining processing executed by an image processing application program employing the present invention.
Figure 20C:
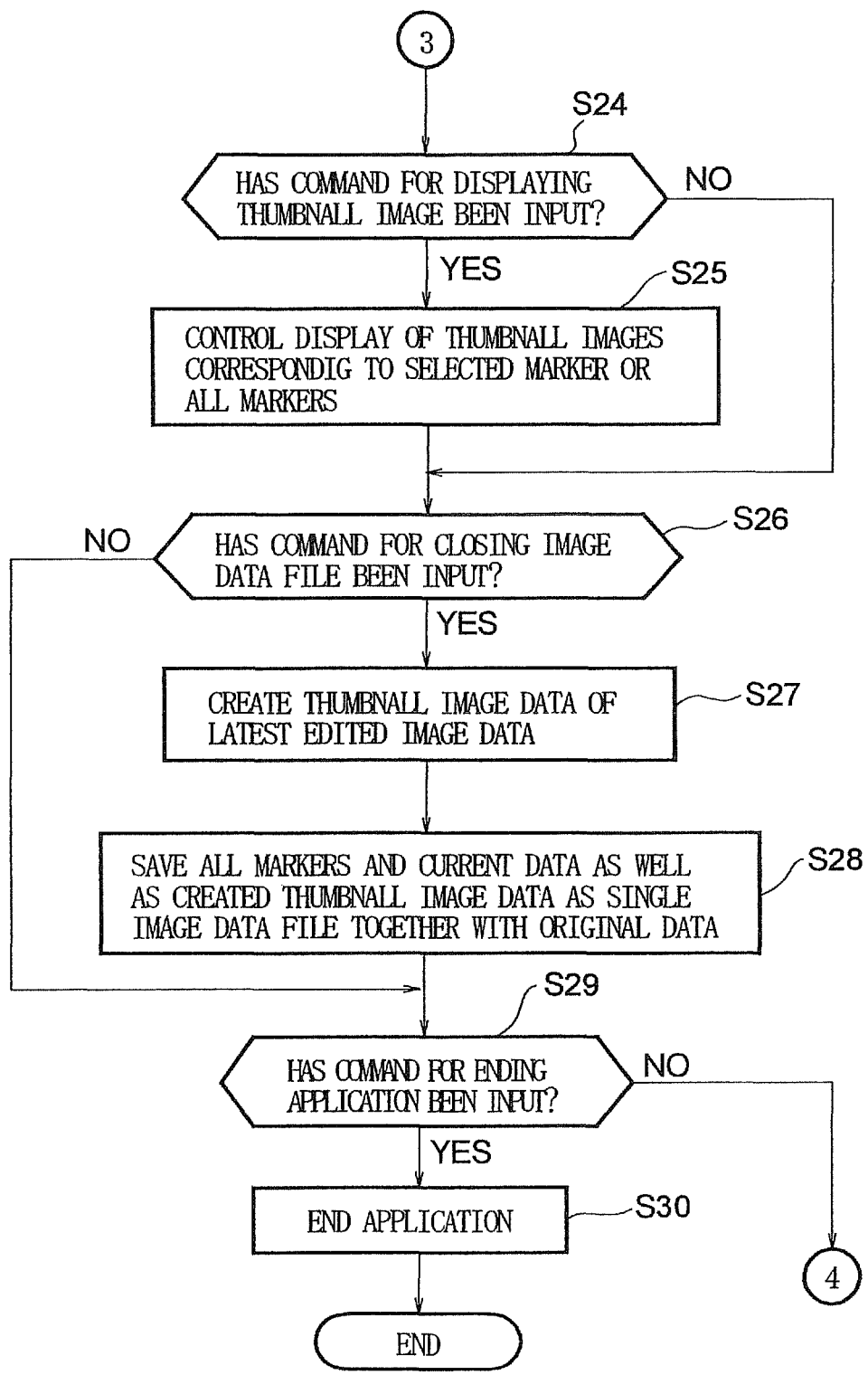
FIG. 20C is a flowchart for explaining processing executed by an image processing application program employing the present invention.

Next, processing of the image processing application program is explained with reference to the flowcharts of FIG. 20A to FIG. 20C.

At step S1, the CPU 10 reads the image processing application program recorded in the memory unit 18 via the I/O interface 15 and bus 14 based on the operational input of the user supplied via the I/O interface 15 and bus 14 and input with the input unit 16, loads this in the RAM 13, and activates the image processing application program.

The processing after the activation of the image processing application program is now described based on the functional block diagram explained with reference to FIG. 2.

At step S2, the operational input acquisition unit 51 determines whether a command for commencing the creation of a new image has been made based on the acquired operational input of the user. When it is determined at step S2 that a command for commencing the creation of a new image has been made, at step S3, the operational input acquisition unit 51 notifies the window display control unit 62 that it received the command for commencing the creation of a new image. The window display control unit 62 controls the display of the display window 81 for creating the new image. At this point, the display window 81 has nothing displayed in the image display area 93, on the screen of the output unit 17. When it is determined at step S2 that a command for commencing the creation of a new image has not been made, or, after the processing of step S3, at step S4, the operational input acquisition unit 51 determines whether a command for opening the file has been made based on the acquired operational input of the user.

When it is determined at step S4 that a command for opening the file has been made, at step S5, the operational input acquisition unit 51 notifies the reading control unit 52 that it received the command for opening the file. The reading control unit 52 reads the data of the image data file selected by the user, and supplies the original data to the original data storage unit 53 and the marker data to the marker storage unit 54, respectively, and saves them therein.

At step S6, the image processing unit 57 determines whether a setting for displaying, in addition to the original data, the edited image subjected to the processing corresponding to all markers upon opening the file has been made.

When it is determined at step S6 that a setting for displaying, in addition to the original data, the edited image subjected to the processing corresponding to all markers upon opening the file has been made, at step S7, the image processing unit 57 acquires the original data from the original data storage unit 53, and the data of all markers from the marker storage unit 54, adds this to the image data corresponding to the original data, creates an edited image data subjected to the processing corresponding to all markers, and supplies this to either the image display control unit 60 or to the thumbnail image creation unit 59, or both. The image data processed with the image display control unit 60 and the thumbnail image creation unit 59 are respectively supplied to the window display control unit 62. Further, the marker data display control unit 61 also supplies the display data to be displayed on the marker display area 101 to the window display control unit 62. The window display control unit 62 displays on the display window 81 the image corresponding to the image data respectively created and the information representing the saved markers with a preset display method based on the data supplied from the image display control unit 60 and the marker data display control unit 61.

When it is determined at step S6 that a setting for displaying, in addition to the original data, the edited image subjected to the processing corresponding to all markers upon opening the file has not been made, at step S8, the image processing unit 57 acquires the original data from the original data storage unit 53, and, when a setting for displaying the image at the time it was saved has been made, acquires data of the marker corresponding to the current process at the time it was saved from the marker storage unit 54, creates an edited image data subjected to the processing corresponding to the current process at the time it was saved, and supplies this to the image display control unit 60. Moreover, when a setting for displaying the original image has been made, the image processing unit 57 supplies the acquired original image to the image display control unit 60. The image data processed with the image display control unit 60 is supplied to the window display control unit 62. Further, the marker data display control unit 61 also supplies the display data to be displayed on the marker display area 101 to the window display control unit 62. The window display control unit 62 controls the display of the data corresponding to the created image data and the information representing the saved markers on the display window 81 based on the data supplied from the image display control unit 60 and the marker data display control unit 61.

When it is determined at step S4 that a command for opening the file has not been made, or after the processing of step S7 or step S8, at step S9, the command and parameter extraction unit 55 determines whether an input of a command and parameter for image processing has been made based on the operational input of the user acquired with the operational input acquisition unit 51. The processing from step S9 to step S28 is performed to the image data file being edited in the active display window 81.

When it is determined at step S9 that an input of a command and parameter for image processing has been made, at step S10, the command and parameter extraction unit 55 supplies the extracted command and corresponding parameter to the process storage unit 56 and the image processing unit 57. The process storage unit 56 newly adds the supplied process to the current process and retains it therein, and the image processing unit 57 executes the image processing corresponding to the supplied process and updates the image data corresponding to the image to be displayed in the image display area 93.

When it is determined at step S9 that an input of a command and parameter for image processing has not been made, or after the processing of step S10, at step S11, the process storage unit 56 determines whether an operational input commanding the creation of a marker has been made based on the operational input of the user acquired with the operational input acquisition unit 51.

When it is determined at step S11 that an operational input commanding the creation of a marker has been made, at step S12, the process storage unit 56 supplies to the marker storage unit 54 the process stored as the current process. The marker storage unit 54 retains the supplied current process as the marker.

When it is determined at step S11 that an operational input commanding the creation of a marker has not been made, or after the processing of step S12, at step S13, the marker storage unit 54 determines whether the marker displayed in the list box of the marker display area 101 of the display window 81 has been selected based on the operational input of the user acquired with the operational input acquisition unit 51.

When it is determined at step S13 that the marker has not been selected, the processing proceeds to step S24 described later.

When it is determined at step S13 that the marker has been selected, at step S14, the marker storage unit 54 determines whether a command for creating a new image data file employing the marker has been made based on the operational input of the user acquired with the operational input acquisition unit 51.

When it is determined at step S14 that a command for creating a new image data file employing the marker has not been made, the processing proceeds to step S19 described later.

When it is determined at step S14 that a command for creating a new image data file employing the marker has been made, since the marker storage unit 54 supplies the selected marker to the marker applied image data creation unit 58, at step S15, the marker applied image data creation unit 58 determines whether a plurality of selected markers was selected at step S13 based on the supplied marker.

When it is determined at step S15 that a plurality of markers has been selected, at step S16, the marker applied image data creation unit 58 creates original data for the plurality of new image data files respectively employing the selected markers and supplies these to the original data storage unit 53.

When it is determined at step S15 that a plurality of markers has not been selected, at step S17, the marker applied image data creation unit 58 creates original data for the new image data file employing the selected marker, and supplies this to the original data storage unit 53.

After the processing of step S16 or step S17, at step S18, the image processing unit 57 reads from the original data storage unit 53 the original data for the created new image data file, supplies this to the image display control unit 60, and the image display control unit 60 additionally controls the display of the display window 81 in which the original data for the new image data file is displayed in the image display area 93. After the processing of step S18, the processing proceeds to step S24 described later.

When it is determined at step S14 that a command for creating a new image data file employing the marker has not been made, at step S19, the marker storage unit 54 determines whether a command for displaying an image in a state corresponding to the selected marker has been made based on the operational input of the user acquired with the operational input acquisition unit 51.

When it is determined at step S19 that a command for displaying an image in a state corresponding to the selected marker has not been made, the processing proceeds to the processing of step S23 described later.

When it is determined at step S19 that a command for displaying an image in a state corresponding to the selected marker has been made, since the marker storage unit 54 supplies to the image processing unit 57 the data of the selected marker, at step S20, the image processing unit 57 creates image data in an editing state corresponding to the retained marker. The display of the created image data to the image display area 93 of the display window 81 is controlled with the processing of the image display control unit 60 and the window display control unit 62.

At step S21, the command and parameter execution unit 55 determines whether an input of a command and parameter for image processing has been made based on the operational input of the user acquired with the operational input acquisition unit 51. When it is determined at step S21 that an input of a command and parameter for image processing has not been made, the processing of step S21 is repeated until it is determined that an input of a command and parameter for image processing has been made.

When it is determined at step S21 that an input of the command and parameter for image processing has been made, at step S22, the command and parameter extraction unit 55 extracts the command and parameter from the operational input of the user acquired with the operational input acquisition unit 51, and supplies this to the process storage unit 56. The process storage unit 56 resets the retained contents of the current process up to the point of the selected marker, and adds the process input after the selection of the marker to the current process.

When it is determined at step S19 that a command for displaying an image in a state corresponding to the selected marker has not been made, at step S23, the operational input acquisition unit 51 determines whether the selection of the marker has been cancelled by the user.

When it is determined at step S23 that the selection of the marker has not been cancelled by the user, the processing returns to step S14, and the subsequent processing is repeated.

When it is determined at step S13 that a marker has not been selected, after the processing of step S18, after the processing of step S22, or when it is determined at step S23 that the selection of the marker has been cancelled by the user, at step S24, the thumbnail image creation unit 59 determines whether a command for displaying thumbnail images has been made based on the operational input of the user acquired with the operational input acquisition unit 51.

When it is determined at step S24 that a command for displaying thumbnail images has been made, at step S25, the thumbnail image creation unit 59 creates thumbnail image data based on the image data created with the image processing unit 57 which corresponds to the marker designated by the user, or all markers. The display of the created thumbnail image data in the image display area 93 of the display window 81 is controlled pursuant to the processing of the image display control unit 60 and the window display control unit 62.

When it is determined at step S24 that a command for displaying thumbnail images has not been made, or after the processing of step S25, at step S26, the operational input acquisition unit 51 determines whether a command for closing the image data file has been made based on the operational input made by the user.

When it is determined at step S26 that a command for closing the image data file has been made, at step S27, the operational input acquisition unit 51 notifies the thumbnail image creation unit 59 that it received the command for closing the image data file. The thumbnail image creation unit 59 acquires the latest edited image data created with the image processing unit 57, and creates thumbnail image data corresponding to the latest edited image data.

At step S28, the operational input acquisition unit 51 notifies the memory control unit 63 that it received a command for closing the image data file. The memory control unit 63 controls the file creation unit 64 and makes it create an image data file to be saved. The file creation unit 64 respectively reads the current process of the image data file commanded to be closed from the process control unit 56, the data of the marker of the image data file commanded to be closed from the marker storage unit 54, the original data corresponding to the image data file commanded to be closed from the original data storage unit 53, and the thumbnail image data corresponding to the latest edited image data from the thumbnail image creation unit 59, creates a single image data file containing the original data, all markers, current data and the thumbnail image data created at step S27, and supplies this to the memory control unit 63. The memory control unit 63 saves the created image data file to be saved in the memory unit 18 such as, e.g., a hard disk or the like, or in the recording medium installed in the drive 20.

When it is determined at step S29 that a command for closing the image data file has not been made, or after the processing of step S28, at step S29, the operational input acquisition unit 51 determines whether a command for ending the application has been made based on the operational input made by the user.

When it is determined at step S29 that a command for ending the application has not been made, the processing returns to step S2, and the subsequent processing is repeated.

When it is determined at step S29 that a command for ending the application has been made, at step S30, the CPU 11 ends the processing of the image processing application program being executed.

As a result of the foregoing processing, according to one aspect of the present invention, a marker corresponding to an editing state at an arbitrary point of time in an image data being edited may be recorded in the memory, and by a user selecting the displayed marker, the image of an arbitrary editing state can be displayed. Here, the original image data is not updated.

Further, when saving the image data file, the saved editing state at an arbitrary point of time may be saved as a single file together with the original image data.

Thus, when reopening a once saved edited image data, since the marker corresponding to the stored editing state also will be opened, this may be used to performed editing processing.

In addition, by selecting a plurality of markers, images corresponding to a plurality of processing states may be displayed at once. Moreover, a marker may be used to create a new image data file of a desired processing state. A plurality of markers may be selected to create a plurality of new image data files.

Further, image data may be displayed as thumbnail images, and thumbnail images and the ordinary image also may be concurrently displayed. Moreover, by displaying a plurality of display windows at once, a plurality of images may be displayed at once on a single screen.

Software capable of making a personal computer execute the processing employing the present invention may be installed by taking a program constituting such software and installing it in a computer with built-in exclusive hardware, or by installing various programs. Such software may be installed in a multipurpose personal computer capable of executing the various functions via, for instance, the various recording mediums illustrated in FIG. 1.

Moreover, the steps defining the program recorded in the recording medium in the present specification include processing to be performed in chronological order along the described sequence, as well as processing to be executed in parallel or independently even if such processing is not performed in chronological order.

Although the foregoing description was based on realizing the execution of the image processing application program, the present invention also may be employed when similar functions as those described above are to be realized with hardware. In other words, the present invention also can be realized with a device having the hardware block structure similar to the functional block diagram explained with reference to FIG. 2, or hardware capable of realizing the functions similar to those explained with reference to FIG. 2.

The invention further includes, as one aspect, the control program described above that can be executed by a controller (e.g., CPU 10) to control an image processing device (e.g., computer 1) as described above. The control program can be provided as a computer-readable computer program product, such as, e.g., a computer-readable recording medium on which the control program is recorded, or it may be a transmittable carrier wave in which the control program is embodied as a data signal. The control program can be implemented in an application specific integrated circuit (ASIC). The control program can be transmitted by a carrier wave over a communications network such as, for example, the World Wide Web and/or transmitted in a wireless fashion, for example, by radio waves or by infrared waves. The control program also can be transmitted from a remote storage facility to a local control unit. In such an arrangement, the local control unit interacts with the remote storage facility to transfer all or part of the program, as needed, for execution by the local unit. Accordingly, the local unit does not require a large amount of memory capacity. The computer-readable recording medium can be, e.g., a CD-ROM, a computer hard drive, RAM, or other types of memories that are readily removable or intended to remain fixed within the computer.

In the illustrated embodiment, the controller (CPU 10 and any necessary memory (ROM and/or RAM)) preferably is implemented using a suitably programmed general purpose computer, e.g., a microprocessor, microcontroller or other processor device (CPU or MPU). It will be appreciated by those skilled in the art, that the controller also can be implemented as a single special purpose integrated circuit (e.g., ASIC) having a main or central processor section for overall, system-level control, and separate sections dedicated to performing various different specific computations, functions and other processes under control of the central processor section. The controller also can be implemented using a plurality of separate dedicated or programmable integrated or other electronic circuits or devices (e.g., hardwired electronic or logic circuits such as discrete element circuits, or programmable logic devices such as PLDs, PLAs, PALs or the like). The controller also can be implemented using a suitably programmed general purpose computer in conjunction with one or more peripheral (e.g., integrated circuit) data and signal processing devices. In general, any device or assembly of devices on which a finite state machine capable of implementing the described procedures can be used as the calculation devices/controller of the invention.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, that are exemplary, other combinations and configurations, including more, less or only a single element, are also within the spirit and scope of the invention.

What is claimed is:

1. An image processing device, comprising:
    an original image data storage unit that saves original image data;
    an operational input acquisition unit that acquires operational inputs of a user;
    a command and parameter storage unit that temporarily saves commands or parameters, acquired through the operational input acquisition unit, for editing the original image data;
    an editing unit that edits the original image data to create edited image data based on the commands or the parameters acquired through the operational input acquisition unit;
    a marker storage unit that saves at least one set of the commands or the parameters in a current editing state that are temporarily saved in the command and parameter storage unit as marker data for showing an editing state at an arbitrary timing when an operational input commanding the storage of the current editing state is acquired through the operational input acquisition unit; and
    a file storage control unit that creates and saves a single image data file containing one original image data and a plurality of marker data for the one original image data, wherein the editing unit edits the original image data within the image data file to create edited image data, based on the commands or the parameters provided in the plurality of marker data within the image data file.

2. An image processing device according to claim 1, further comprising a thumbnail image data creation unit that creates thumbnail image data based on at least one of the original image data and the edited image data edited and created with the editing unit.

3. An image processing device according to claim 1, further comprising an image data display control unit that controls display of at least one of the original image data and the edited image data edited and created with the editing unit.

4. An image processing device according to claim 3, further comprising a thumbnail image data creation unit that creates thumbnail image data based on at least one of the original image data and the edited image data edited and created with the editing unit, wherein the image data display control unit also controls the display of the thumbnail image data created with the thumbnail image data creation unit.

5. An image processing device according to claim 3, further comprising a reading control unit that controls the reading of the image data file saved by the file storage control unit, wherein the editing unit edits the original image data and creates a plurality of the edited image data based on the commands or the parameters provided in the plurality of marker data contained in the image data file, and the image data display control unit controls the display of the edited image data created with the editing unit.

6. An image processing device according to claim 3, further comprising a marker data display control unit that controls display of a list of the marker data saved with the marker storage unit, wherein when an operational input is acquired with the operational input acquisition unit for selecting one of the marker data in the displayed list, the editing unit edits the original image data and creates edited image data based on the commands or the parameters provided in the marker data that was selected, and the image data display control unit controls the display of the edited image data edited with the editing unit.

7. An image processing device according to claim 6, wherein when the operational input acquired with the operational input acquisition unit is an operational input for selecting two or more marker data among the marker data in the displayed list, the editing unit edits the original image data and creates a plurality of the edited image data based on the commands or the parameters in each of the two or more marker data selected.

8. An image processing device according to claim 7, further comprising a thumbnail image data creation unit that creates thumbnail image data based on at least one of the original image data and the edited image data edited and created with the editing unit, wherein the thumbnail image data creation unit creates a plurality of the thumbnail image data based on a plurality of the edited image data edited and created based on the selected two or more of marker data.

9. An image processing device according to claim 1, wherein when an operational input for commanding the storage of the image data file is acquired with the operational input acquisition unit, the file storage control unit controls the storage of a single image data file containing the original image data saved with the original image data storage unit and the marker data saved with the marker storage unit.

10. An image processing device according to claim 9, wherein the single image data file stored by the file storage control unit further contains the commands or parameters saved with the command and parameter storage unit in addition to the original image data saved with the original image data storage unit and the marker data saved with the marker storage unit.

11. An image processing device according to claim 1, further comprising:
    a marker data display control unit that controls a display of a list of the marker data saved with the marker storage unit; and
    a new original image data creation unit that edits the original image data and creates new original image data based on the commands or the parameters provided in the marker data saved with the marker storage unit.

12. An image processing device according to claim 11, wherein when the operational input acquired with the operational input acquisition unit is an operational input for selecting two or more marker data among the marker data in the displayed list, the new original image data creation unit edits the original image data and creates a plurality of the new original image data based on the commands or the parameters provided in each of the two or more marker data.

13. An image processing device according to claim 1, further comprising:
a reading control unit that controls reading of the image data file including the plurality of marker data,
wherein the reading control unit automatically reads each of the plurality of marker the data sequentially, and
the editing unit edits the original image data within the image data file, based on each of the plurality of the marker data that has been read.

14. An image processing device, comprising:
a memory that stores image data including original image data; and
a controller that:
acquires operational inputs of a user;
temporarily saves commands or parameters, acquired through the operational inputs of the user, for editing the original image data;
edits the original image data to create edited image data based on the acquired commands or parameters;
saves the commands or parameters in a current editing state, temporarily saved in a command and parameter storage, as marker data for showing the editing state at an arbitrary timing when an operational input commanding storage of the current editing state is acquired through the operational inputs of the user; and
creates and saves a single image data file containing the stored original image data and a plurality of the saved marker data,
wherein the controller edits the original image data in the image data file to create edited image data, based on the commands or the parameters provided in the marker data in the plurality of image data file.

15. A non-transitory computer-readable medium storing a computer program having computer-executable instructions to cause a computer to perform a plurality of steps comprising:
an original image data storage control step of controlling the storage of original image data;
an operational input acquisition step of acquiring operational inputs of a user;
a command and parameter storage control step of controlling temporary storage of commands or parameters, acquired with the operational input acquisition step, for editing the original image data;
an editing step of editing the original image data to create edited image data based on the commands or parameters acquired with the operational input acquisition step;
a marker storage control step of controlling the storage of at least one set of the commands or parameters in a current editing state that are temporarily stored in the command and parameter storage control step as marker data for showing the editing state at an arbitrary timing when an operational input commanding the storage of the current editing state is acquired with the operational input acquisition step; and
a file storage control step of creating a single image data file containing one original image data and a plurality of marker data for the one original image data,
wherein the editing step edits the original image data within the image data file to create edited image data, based on the commands or the parameters provided in the plurality of marker data in the image data file.

* * * * *